(12) United States Patent
Bulpitt et al.

(10) Patent No.: US 12,071,085 B2
(45) Date of Patent: Aug. 27, 2024

(54) CONTROLLING DC-TO-DC CONVERTERS CONNECTED IN PARALLEL

(71) Applicant: Toyota Motor Engineering & Manufacturing North America, Inc., Plano, TX (US)

(72) Inventors: Christopher M. Bulpitt, Los Angeles, CA (US); Ron J. Toth, Redondo Beach, CA (US); Scott A. Friedman, Dallas, TX (US); Luke A Rippelmeyer, Plano, TX (US); Rathin Karhu, Irvine, CA (US); Daniel Charles Folick, Long Beach, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 591 days.

(21) Appl. No.: 17/345,294

(22) Filed: Jun. 11, 2021

(65) Prior Publication Data
US 2022/0396225 A1 Dec. 15, 2022

(51) Int. Cl.
*B60R 16/033* (2006.01)
*H02M 1/00* (2007.01)
*H02M 3/04* (2006.01)

(52) U.S. Cl.
CPC ......... *B60R 16/033* (2013.01); *H02M 1/0009* (2021.05); *H02M 3/04* (2013.01); *B60L 2210/10* (2013.01)

(58) Field of Classification Search
CPC ..... B60R 16/033; H02M 1/0009; H02M 3/04; H02M 3/285; H02M 3/1584; H02M 1/10; B60L 2210/10
See application file for complete search history.

(56) References Cited

U.S. PATENT DOCUMENTS

| 6,343,026 B1 * | 1/2002 | Perry | H02M 3/285 |
| | | | 323/272 |
| 6,574,125 B2 | 6/2003 | Matsukawa et al. | |

(Continued)

FOREIGN PATENT DOCUMENTS

| CN | 202847461 U | 4/2013 |
| CN | 107800300 A | 3/2018 |

OTHER PUBLICATIONS

Kartheek et al., "Simulation of Bidirectional DC-DC Converter for Hybrid Battery Vehicles," International Journal of Innovative Technology and research, vol. 4, issue 6, pp. 4895-4900, 2016.

(Continued)

*Primary Examiner* — Jared Fureman
*Assistant Examiner* — Aqeel H Bukhari
(74) *Attorney, Agent, or Firm* — Christopher G. Darrow; DARROW MUSTAFA PC

(57) ABSTRACT

A system for controlling DC-to-DC converters connected in parallel can include a first DC-to-DC converter, a second DC-to-DC converter, and a controller. The first DC-to-DC converter can be connected between a first node and a second node. The first DC-to-DC converter can be configured to maintain a voltage level at the second node. The second DC-to-DC converter can be connected between the first node and the second node. The controller can be configured to measure a current through the first DC-to-DC converter. The controller can be configured to cause, in response to a measure of the current being in a specific relationship with respect to a threshold current, a change in electric power being conveyed through the second DC-to-DC converter to cause the second DC-to-DC converter to respond to a subsequent change in electric power being conveyed through the second node.

20 Claims, 15 Drawing Sheets

(56) References Cited

U.S. PATENT DOCUMENTS

| | | | |
|---|---|---|---|
| 7,889,524 B2 | 2/2011 | Lee et al. | |
| 8,513,928 B2 | 8/2013 | Totterman et al. | |
| 9,667,056 B2 | 5/2017 | Luebke et al. | |
| 2002/0163255 A1 | 11/2002 | Soo et al. | |
| 2013/0155736 A1 | 6/2013 | Ilic et al. | |
| 2021/0159784 A1* | 5/2021 | Koerner | H02M 3/04 |
| 2023/0163683 A1* | 5/2023 | Molina Llorente | H02M 3/1584 323/234 |

OTHER PUBLICATIONS

Wang et al., "Hybrid Fuel Cell and Li Battery Power System For small UAV Application," 18 pages.

Letha et al., "Bidirectional DC to DC Converters: An Overview of Various Topologies, Switching Schemes and Control Techniques," International Journal of Engineering and Technology, vol. 7, pp. 360-365, Sep. 2018.

Girma et al., "Voltage control of bidirectional DC-DC converter with constant power source," MATEC Web of Conferences 232, pp. 1-5, 2018.

Al Sakka et al., "DC/DC Converters for Electric Vehicles" Modelling and Simulations, Seref Soylu, IntechOpen, 28 pages, 2011.

Unknown, "Constant Current Control for DC-DC Converters," Vicor, pp. 1-15.

Unknown, "DC-to-DC converter," found at https://en.wikipedia.org/wiki/DC-to-DC_converter.

\* cited by examiner

CONTROLLING DC-TO-DC CONVERTERS CONNECTED IN PARALLEL

TECHNICAL FIELD

The disclosed technologies are directed to controlling DC-to-DC converters connected in parallel.

BACKGROUND

An engine of a conventional motor vehicle can, through a combustion process, consume a fossil fuel to produce a propulsion force. Because waste products of the combustion process can include pollutants, efforts have been made to produce the propulsion force through different mechanisms. Among such efforts have been those that can use an electric motor to produce the propulsion force. A vehicle that uses an electric motor to produce the propulsion force can be referred to as an electric vehicle. Electric power to the electric motor can be provided from one or more energy storage devices. Often, the electric power to the electric motor can be provided from a plurality of energy storage devices in which a type of a first energy storage device can be different from a type of second energy storage device. Examples of types of energy storage devices can include a battery, a capacitor (e.g., a supercapacitor), or a fuel cell system. The fuel cell system can include a tank configured to store a fuel. For example, the fuel can be hydrogen. Due to design considerations with respect to one or more of size, weight, power, or current limitations, a voltage level of the electric motor can be different from one or more voltage levels of the plurality of energy storage devices. DC-to-DC converters can be used to change voltage levels between the electric motor and the plurality of energy storage devices.

SUMMARY

In an embodiment, a system for controlling DC-to-DC converters connected in parallel can include a first DC-to-DC converter, a second DC-to-DC converter, and a controller. The first DC-to-DC converter can be connected between a first node and a second node. The first DC-to-DC converter can be configured to maintain a voltage level at the second node. The second DC-to-DC converter can be connected between the first node and the second node. The controller can be configured to measure a current through the first DC-to-DC converter. The controller can be configured to cause, in response to a measure of the current through the first DC-to-DC converter being in a specific relationship with respect to a threshold current, a change in electric power being conveyed through the second DC-to-DC converter to cause the second DC-to-DC converter to respond to a subsequent change in electric power being conveyed through the second node.

In another embodiment, a controller for controlling DC-to-DC converters connected in parallel can include first circuitry and second circuitry. The first circuitry can be configured to measure a current through a first DC-to-DC converter. The first DC-to-DC converter can be connected between a first node and a second node. The first DC-to-DC converter can be configured to maintain a voltage level at the second node. The second circuitry can be configured to cause, in response to a measure of the current through the first DC-to-DC converter being in a specific relationship with respect to a threshold current, a change in electric power being conveyed through a second DC-to-DC converter to cause the second DC-to-DC converter to respond to a subsequent change in electric power being conveyed through the second node. The second DC-to-DC converter can be connected between the first node and the second node.

In another embodiment, a method for controlling DC-to-DC converters connected in parallel can include measuring, by a controller, a current through a first DC-to-DC converter. The first DC-to-DC converter can be connected between a first node and a second node. The first DC-to-DC converter can be configured to maintain a voltage level at the second node. The method can include causing, by the controller and in response to a measure of the current through the first DC-to-DC converter being in a specific relationship with respect to a threshold current, a change in electric power being conveyed through a second DC-to-DC converter to cause the second DC-to-DC converter to respond to a subsequent change in electric power being conveyed through the second node. The second DC-to-DC converter can be connected between the first node and the second node.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
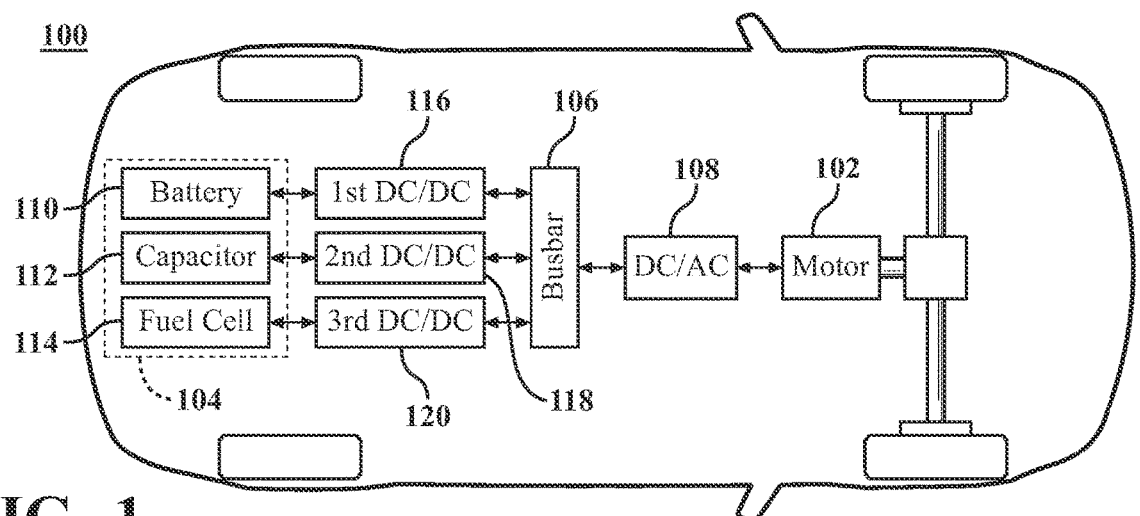
FIG. 1 is a diagram that illustrates an example of an electric vehicle, according to the disclosed technologies.

The disclosed technologies can control DC-to-DC converters connected in parallel. A system according to the disclosed technologies can include a first DC-to-DC converter, a second DC-to-DC converter, and a controller. The first DC-to-DC converter can be connected between a first node and a second node. The first DC-to-DC converter can be configured to maintain a voltage level at the second node. The second DC-to-DC converter can be connected between the first node and the second node. The controller can be configured to measure a current through the first DC-to-DC converter. The controller can be configured to cause, in response to a measure of the current through the first DC-to-DC converter being in a specific relationship with respect to a threshold current, a change in electric power being conveyed through the second DC-to-DC converter to cause the second DC-to-DC converter to respond to a subsequent change in electric power being conveyed through the second node.

Having control of the second DC-to-DC converter be based on the measure of the current through the first DC-to-DC converter can prevent undesirable variations in amounts of electric power that are conveyed through both the first DC-to-DC converter and the second DC-to-DC converter associated with controlling both the first DC-to-DC converter and the second DC-to-DC converter based on a measure of the voltage level at the second node. Such undesirable variations in the amounts of electric power can occur due to a difference between a measure, by the first DC-to-DC converter, of the voltage level at the second node and a measure, by the second DC-to-DC converter, of the voltage level at the second node. Such a difference can be caused in a situation in which the voltage level at the second node is defined to be at: (1) a first voltage level by a voltage sensor of the first DC-to-DC converter and (2) a second voltage level by a voltage sensor of the second DC-to-DC converter. A difference between the first voltage level and an actual voltage level at the second node can be within a degree of tolerance of the voltage sensor of the first DC-to-DC converter. Likewise, a difference between the second voltage level and the actual voltage level at the second node can be within a degree of tolerance of the voltage sensor of the second DC-to-DC converter. However, if the first voltage level is different from a voltage level at the second node that is desired to be maintained, then the first DC-to-DC converter can act to cause the voltage level at the second node to be at the voltage level that is desired to be maintained Likewise, if the second voltage level is different from the voltage level at the second node that is desired to be maintained, then the second DC-to-DC converter can act to cause the voltage level at the second node to be at the voltage level that is desired to be maintained. Such a situation, in which both the first DC-to-DC converter and the second DC-to-DC converter attempt to maintain the voltage level at the second node, can cause, because of a difference between degrees of tolerance of voltages sensors of the first DC-to-DC converter and the second DC-to-DC converter, undesirable variations in the voltage level at the second node, which, in turn, can cause undesirable variations in amounts of electric power that are conveyed through both the first DC-to-DC converter and the second DC-to-DC converter.

Due to design considerations with respect to one or more of size, weight, power, or current limitations, a voltage level of an electric motor, used to provide a propulsion force for a vehicle (e.g., an electric vehicle), can be different from one or more voltage levels of a plurality of energy storage devices that provide electric power to the electric motor. DC-to-DC converters can be used to change voltage levels between the electric motor and the plurality of energy storage devices.

However, a conventional commercially available DC-to-DC converter can also have design considerations that can limit its ability to change voltage levels between the electric motor and the plurality of energy storage devices. For example, an amount of electric power needed to produce a propulsion force for a vehicle, which can weigh, for example, at least one-and-one-half tons, can be substantially greater than an electric power capability of a conventional commercially available DC-to-DC converter. For example, if an energy storage device is configured to produce electric power at a voltage level of 300 volts, but a conventional commercially available DC-to-DC converter is limited to produce electric power at a current level of 300 amperes, then the conventional commercially available DC-to-DC converter can be limited to produce electric power at 90 kilowatts. For at least these reasons, in order to have an ability to change voltage levels between the electric motor and the plurality of energy storage devices with an amount of electric power needed to produce a propulsion force for such a vehicle, DC-to-DC converters can be connected in parallel.

FIG. 1 is a diagram that illustrates an example of an electric vehicle 100, according to the disclosed technologies. The electric vehicle 100 can include, for example, an electric motor 102, a plurality of energy storage devices 104, a busbar 106, and an inverter 108. The plurality of energy storage devices 104 can include, for example, a battery 110, a capacitor 112 (e.g., a supercapacitor), and a fuel cell system 114. The fuel cell system 114 can include a tank (not illustrated) configured to store a fuel. For example, the fuel can be hydrogen. A voltage level of the battery 110 can be at a first voltage level. A voltage level of the capacitor 112 can be at a second voltage level. A voltage level of the fuel cell system 114 can be at a third voltage level. A voltage level of the busbar 106 can be at a fourth voltage level. A first DC-to-DC converter 116 can be used to change voltage levels between the first voltage level and the fourth voltage level. A second DC-to-DC converter 118 can be used to change voltage levels between the second voltage level and the fourth voltage level. A third DC-to-DC converter 120 can be used to change voltage levels between the third voltage level and the fourth voltage level. The inverter 108 can be used to convert the fourth voltage level from a direct current (DC) voltage to an alternating current (AC) voltage to provide electric power to the electric motor 102. The electric motor 102 can produce a propulsion force for the electric vehicle 100.

Because an amount of electric power needed to produce the propulsion force for the vehicle 100 can be substantially greater than an electric power capability of a conventional commercially available DC-to-DC converter, one or more of the first DC-to-DC converter 116, the second DC-to-DC converter 118, or the third DC-to-DC converter 120 can be one or more DC-to-DC converters can be connected in parallel.

Figure 2:
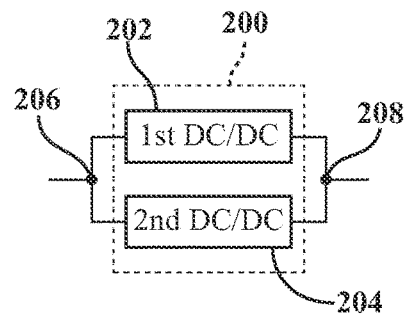
FIG. 2 is a diagram that illustrates two DC-to-DC converters connected in parallel.

FIG. 2 is a diagram that illustrates two DC-to-DC converters 200 connected in parallel. The two DC-to-DC converters 200 connected in parallel can include a first DC-to-DC converter 202 and a second DC-to-DC converter 204. The first DC-to-DC converter 202 can be connected between a first node 206 and a second node 208. The first DC-to-DC converter 202 can be configured to maintain a voltage level at the second node 208. The second DC-to-DC converter 204 can be connected between the first node 206 and the second node 208. The second DC-to-DC converter 204 can be configured to maintain the voltage level at the second node 208. Both the first DC-to-DC converter 202 and the second DC-to-DC converter 204 can be controlled based on a measure of the voltage level at the second node 208.

Figure 3:
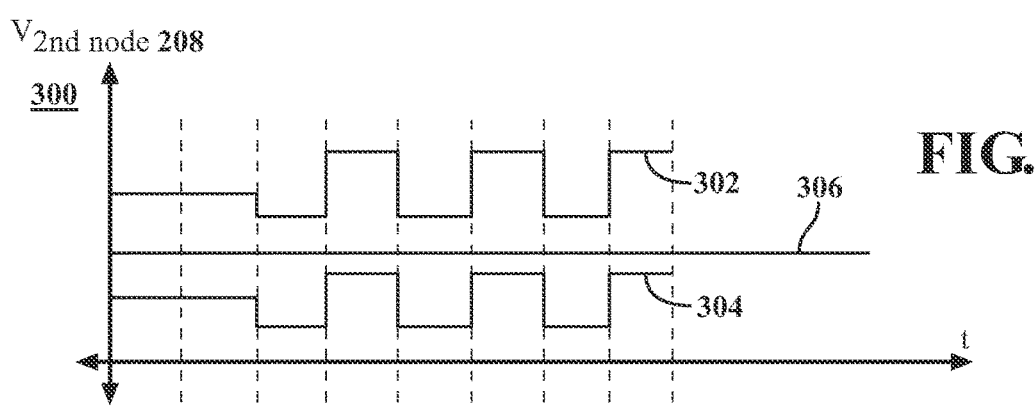
FIG. 3 is a graph of examples of voltage level versus time with respect to measures of a voltage level at a second node.

FIG. 3 is a graph 300 of examples of voltage level versus time with respect to measures of the voltage level at the second node 208. The graph 300 can include a first function 302, a second function 304, and a third function 306. The first function 302 can represent an example of the voltage level versus time for a measure, by the first DC-to-DC converter 202, of the voltage level at the second node 208. The second function 304 can represent an example of the voltage level versus time for a measure, by the second DC-to-DC converter 204, of the voltage level at the second node 208. The third function 306 can represent an example of a voltage level at the second node 208 that is desired to be maintained.

Because the measure, by the first DC-to-DC converter 202, of the voltage level at the second node 208 is greater than the voltage level at the second node 208 that is desired to be maintained, the first DC-to-DC converter 202 can act to cause the voltage level at the second node 208 to be at the voltage level that is desired to be maintained by causing the voltage level at the second node 208 to decrease. In response to this, because the measure, by the second DC-to-DC converter 204, of the voltage level at the second node 208 is less than the voltage level at the second node 208 that is desired to be maintained, the second DC-to-DC converter 204 can act to cause the voltage level at the second node 208 to be at the voltage level that is desired to be maintained by causing the voltage level at the second node 208 to increase. Such a situation, in which the first DC-to-DC converter 202 can act to cause the voltage level at the second node 208 to decrease while the second DC-to-DC converter 204 can act to cause the voltage level at the second node 208 to increase, can cause undesirable variations in the voltage level at the second node 208.

Figure 4:
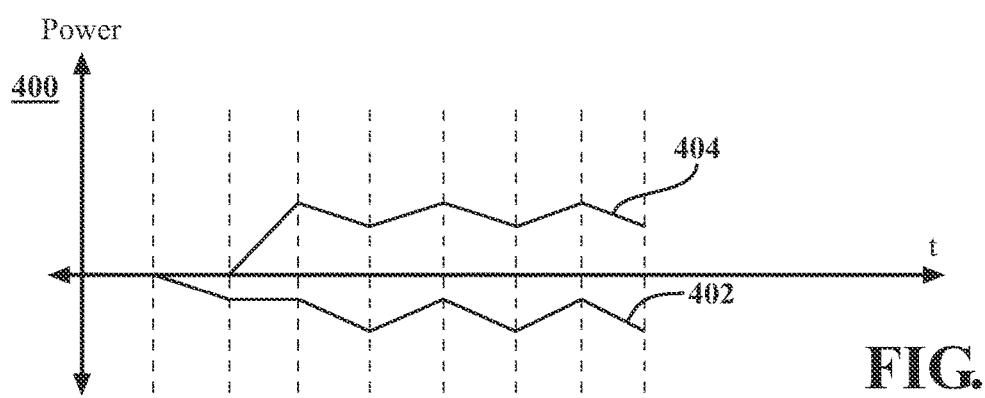
FIG. 4 is a graph of examples of electric power versus time with respect to amounts of electric power that are conveyed through two DC-to-DC converters connected in parallel.

FIG. 4 is a graph 400 of examples of electric power versus time with respect to amounts of electric power that are conveyed through the two DC-to-DC converters 200 connected in parallel. The graph 400 can include a first function 402 and a second function 404. The first function 402 can represent an example of the amount of electric power that is conveyed, versus time, through the first DC-to-DC converter 202. The second function 404 can represent an example of the amount of electric power that is conveyed, versus time, through the second DC-to-DC converter 204.

Because the measure, by the first DC-to-DC converter 202, of the voltage level at the second node 208 is greater than the voltage level at the second node 208 that is desired to be maintained, the first DC-to-DC converter 202 can act to cause the voltage level at the second node 208 to be at the voltage level that is desired to be maintained by causing the voltage level at the second node 208 to decrease, which, in turn, can cause the amount of electric power that is conveyed through the first DC-to-DC converter 202 to decrease. In response to this, because the measure, by the second DC-to-DC converter 204, of the voltage level at the second node 208 is less than the voltage level at the second node 208 that is desired to be maintained, the second DC-to-DC converter 204 can act to cause the voltage level at the second node 208 to be at the voltage level that is desired to be maintained by causing the voltage level at the second node 208 to increase, which, in turn, can cause the amount of electric power that is conveyed through the second DC-to-DC converter 204 to increase. Such a situation can cause undesirable variations in the amounts of electric power that are conveyed through the two DC-to-DC converters 200 connected in parallel.

Figure 5:
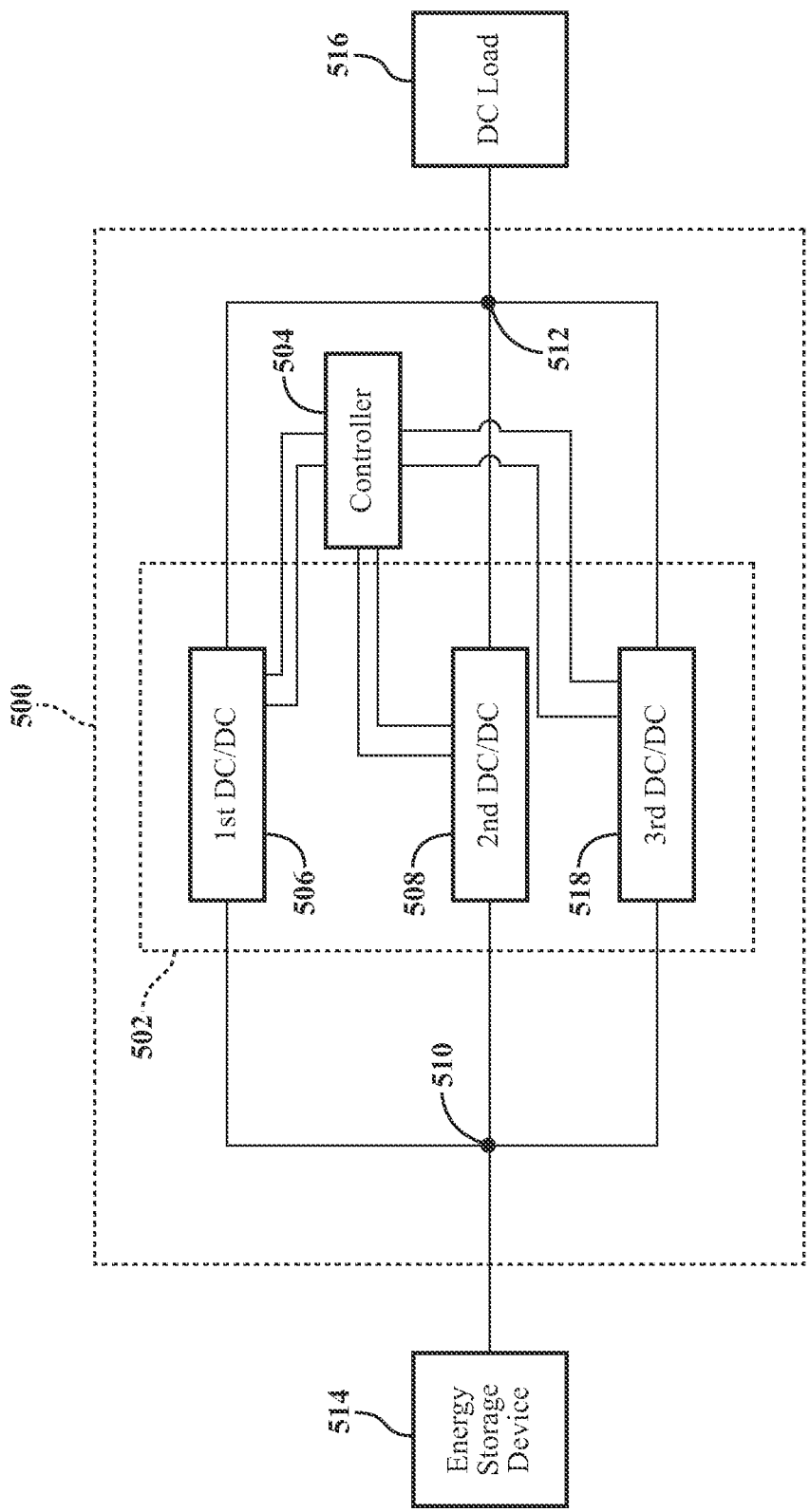
FIG. 5 is a diagram that illustrates an example of a system for controlling DC-to-DC converters connected in parallel, according to the disclosed technologies.

FIG. 5 is a diagram that illustrates an example of a system 500 for controlling DC-to-DC converters 502 connected in parallel, according to the disclosed technologies. The system 500 can include, for example, the DC-to-DC converters 502 and a controller 504. The DC-to-DC converters 502 can include, for example, a first DC-to-DC converter 506 and a second DC-to-DC converter 508. The first DC-to-DC converter 506 can be connected between a first node 510 and a second node 512. The first DC-to-DC converter 506 can be configured to maintain a first voltage level at the second node 512. The second DC-to-DC converter 508 can be connected between the first node 510 and the second node 512. The controller 504 can be configured to measure a current through the first DC-to-DC converter 506. The controller 504 can be configured to cause, in response to a measure of the current through the first DC-to-DC converter 506 being in a specific relationship with respect to a first threshold current, a change in electric power being conveyed through the second DC-to-DC converter 508 to cause the second DC-to-DC converter 508 to respond to a first subsequent change in electric power being conveyed through the second node 512. For example, the current through the first DC-to-DC converter 506 can be caused by a change in electric power being conveyed through the first DC-to-DC converter 506 as the first DC-to-DC converter 506 maintains the first voltage level at the second node 512.

Additionally, for example, the controller 504 can be further configured to control: (1) an output voltage of the first DC-to-DC converter 506 to maintain the first voltage level at the second node 512 and (2) an output current of the second DC-to-DC converter 508 in response to the measure of the current through the first DC-to-DC converter 506. For example, a response time of the first DC-to-DC converter 506 to a change in electric power being conveyed through the second node 512 can be faster than a response time of the second DC-to-DC converter 508 to the change in electric power being conveyed through the second node 512.

For example, one or more of the first DC-to-DC converter 506 or the second DC-to-DC converter 508 can include one or more of a step-down (buck) converter, a step-up (boost) converter, an inverting (buck-boost) converter, a true buck-boost converter, a single-ended primary-inductor converter (SEPIC), a auk converter, a split-pi (boost-buck) converter, a forward converter, a push-pull (half bridge) converter, a full bridge converter, a flyback converter, an interleaved converter, a switched capacitor converter, an electromechanical converter, or the like.

For example: (1) the first DC-to-DC converter 506 can include a first bidirectional converter and can be further configured to maintain a second voltage level at the first node 510 and (2) the second DC-to-DC converter 508 can include a second bidirectional converter.

For example, the second DC-to-DC converter 508 can be identical to the first DC-to-DC converter 506.

For example, the first node 510 can be configured to be connected to an energy storage device 514. The energy storage device 514 can be configured to provide electric power at a second voltage level. For example, the energy storage device 514 can include one of a battery, a capacitor (e.g., a supercapacitor), a fuel cell system, or the like. The fuel cell system can include a tank configured to store a fuel. For example, the fuel can be hydrogen.

For example, the second node 512 can be configured to be connected to a DC load 516. For example, the DC load 516 can include one or more of a busbar, an inverter, or the like.

For example, the system 500 can be disposed on a vehicle. For example, the vehicle can be the electric vehicle 100 (illustrated in FIG. 1). For example, one or more of the first DC-to-DC converter 116, the second DC-to-DC converter 118, or the third DC-to-DC converter 120 (illustrated in FIG. 1) can include the system 500.

Figure 6:
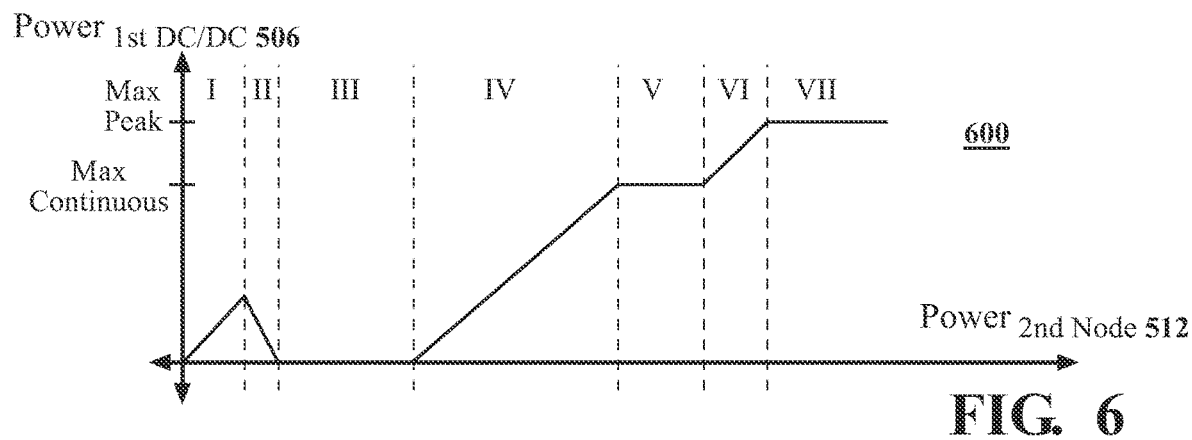
FIG. 6 is a graph of a first example of an amount of electric power that is being conveyed through a first DC-to-DC converter versus an amount of electric power that is being conveyed through the second node.

FIG. 6 is a graph 600 of a first example of an amount of electric power that is being conveyed through the first DC-to-DC converter 506 versus an amount of electric power that is being conveyed through the second node 512. The graph 600 can include a portion I, a portion II, a portion III, a portion IV, a portion V, a portion VI, and a portion VII.

Figure 7:
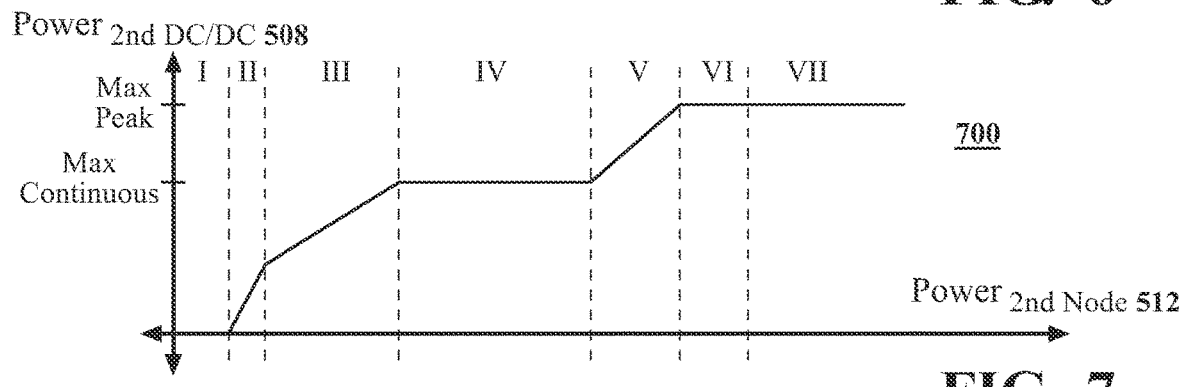
FIG. 7 is a graph of a first example of an amount of electric power that is being conveyed through a second DC-to-DC converter versus the amount of electric power that is being conveyed through the second node.

FIG. 7 is a graph 700 of a first example of an amount of electric power that is being conveyed through the second DC-to-DC converter 508 versus the amount of electric power that is being conveyed through the second node 512. The graph 700 can include a portion I, a portion II, a portion III, a portion IV, a portion V, a portion VI, and a portion VII.

With reference to FIGS. 5-7, for example, an initial change in electric power being conveyed through the second node 512 can be an initial increase in electric power being conveyed through the second node 512 (e.g., portion I). As described above, because a response time of the first DC-to-DC converter 506 to a change in electric power being conveyed through the second node 512 can be faster than a response time of the second DC-to-DC converter 508 to the change in electric power being conveyed through the second node 512, the controller 504 can be further configured to cause the first DC-to-DC converter 506 to respond to the initial increase in electric power being conveyed through the second node 512.

Additionally, for example, the first subsequent change in electric power being conveyed through the second node 512 can be a first subsequent increase in electric power being conveyed through the second node 512 (e.g., portions II and III). For example, the specific relationship with respect to the first threshold current can be being greater than or equal to the first threshold current. As described above, the controller 504 can be configured to measure the current through the first DC-to-DC converter 506. The controller 504 can be configured to cause, in response to a measure of the current through the first DC-to-DC converter 506 being greater than or equal to the first threshold current, a change in electric power being conveyed through the second DC-to-DC converter 508 to cause the second DC-to-DC converter 508 to respond to the first subsequent increase in electric power being conveyed through the second node 512. The controller 504 can be further configured to cause, in response to the second DC-to-DC converter 508 having been caused to respond to the first subsequent increase in electric power being conveyed through the second node 512: (1) an output electric power of the first DC-to-DC converter 506 to remain constant, decrease, or both and (2) an output electric power of the second DC-to-DC converter 508 to increase.

Additionally, for example, the controller 504 can be further configured to measure a current through the second DC-to-DC converter 508. The controller 504 can be further configured to cause, in response to a measure of the current through the second DC-to-DC converter 508 being greater than or equal to a second threshold current, a change in electric power being conveyed through the first DC-to-DC converter 506 to cause the first DC-to-DC converter 506 to respond to a second subsequent increase in electric power being conveyed through the second node 512 (e.g., portion IV). The second threshold current can be greater than the first threshold current. For example, the second threshold current can be associated with a rating for a maximum continuous electric power of the second DC-to-DC converter 508.

Additionally, for example, the controller 504 can be further configured to cause, in response to the first DC-to-DC converter 506 having been caused to respond to the second subsequent increase in electric power being conveyed through the second node 512: (1) the output electric power of the second DC-to-DC converter 508 to remain constant and (2) the output electric power of the first DC-to-DC converter 506 to increase.

Additionally, for example, the controller 504 can be further configured to cause, in response to the measure of the current through the first DC-to-DC converter 506 being greater than or equal to the second threshold current, another change in electric power being conveyed through the second DC-to-DC converter 508 to cause the second DC-to-DC converter 508 to respond to a third subsequent increase in electric power being conveyed through the second node 512

(e.g., portion V). For example, the second threshold current can be associated with a rating for a maximum continuous electric power of the first DC-to-DC converter 506.

Additionally, for example, the controller 504 can be further configured to cause, in response to the second DC-to-DC converter 508 having been caused to respond to the third subsequent increase in electric power being conveyed through the second node 512: (1) the output electric power of the first DC-to-DC converter 506 to remain constant and (2) the output electric power of the second DC-to-DC converter 508 to increase.

Additionally, for example, the controller 504 can be further configured to cause, in response to the measure of the current through the second DC-to-DC converter 508 being greater than or equal to a third threshold current, another change in electric power being conveyed through the first DC-to-DC converter 506 to cause the first DC-to-DC converter 506 to respond to a fourth subsequent increase in electric power being conveyed through the second node 512 (e.g., portion VI). The third threshold current can be greater than the second threshold current. For example, the third threshold current can be associated with a rating for a maximum peak electric power of the second DC-to-DC converter 508.

Additionally, for example, the controller 504 can be further configured to cause, in response to the first DC-to-DC converter 506 having been caused to respond to the fourth subsequent increase in electric power being conveyed through the second node 512: (1) the output electric power of the second DC-to-DC converter 508 to remain constant and (2) the output electric power of the first DC-to-DC converter 506 to increase. For example, the output electric power of the first DC-to-DC converter 506 can increase until the output electric power of the first DC-to-DC converter 506 is equal to a rating for a maximum peak electric power of the first DC-to-DC converter 506 (e.g., portion VII).

Figure 8:
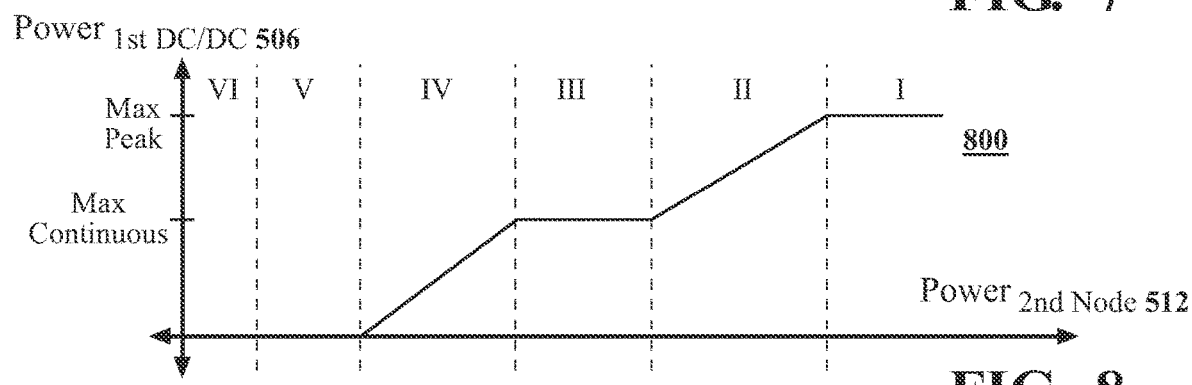
FIG. 8 is a graph of a second example of the amount of electric power that is being conveyed through the first DC-to-DC converter versus the amount of electric power that is being conveyed through the second node.

FIG. 8 is a graph 800 of a second example of the amount of electric power that is being conveyed through the first DC-to-DC converter 506 versus the amount of electric power that is being conveyed through the second node 512. The graph 800 can include a portion I, a portion II, a portion III, a portion IV, a portion V, and a portion VI.

Figure 9:
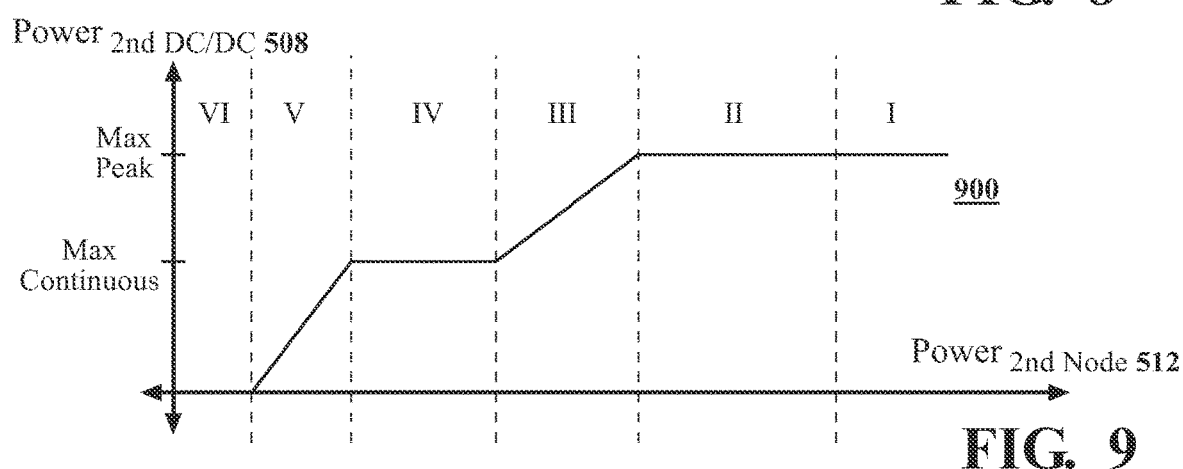
FIG. 9 is a graph of a second example of the amount of electric power that is being conveyed through the second DC-to-DC converter versus the amount of electric power that is being conveyed through the second node.

FIG. 9 is a graph 900 of a second example of the amount of electric power that is being conveyed through the second DC-to-DC converter 508 versus the amount of electric power that is being conveyed through the second node 512. The graph 900 can include a portion I, a portion II, a portion III, a portion IV, a portion V, and a portion VI.

With reference to FIGS. 5, 8, and 9, for example, an initial electric power being conveyed through the second node 512 can be associated with a sum of a rating for a maximum peak electric power of the first DC-to-DC converter 506 added to a rating for a maximum peak electric power of the second DC-to-DC converter 508 (e.g., portion I). For example, an initial change in electric power being conveyed through the second node 512 can be an initial decrease in electric power being conveyed through the second node 512 (e.g., portion II). As described above, the controller 504 can be further configured to cause the first DC-to-DC converter 506 to respond to the initial decrease in electric power being conveyed through the second node 512.

Additionally, for example, the first subsequent change in electric power being conveyed through the second node 512 can be a first subsequent decrease in electric power being conveyed through the second node 512 (e.g., portion III). For example, the specific relationship with respect to the first threshold current can be being less than or equal to the first threshold current. As described above, the controller 504 can be configured to measure the current through the first DC-to-DC converter 506. The controller 504 can be configured to cause, in response to a measure of the current through the first DC-to-DC converter 506 being less than or equal to the first threshold current, a change in electric power being conveyed through the second DC-to-DC converter 508 to cause the second DC-to-DC converter 508 to respond to the first subsequent decrease in electric power being conveyed through the second node 512. For example, the first threshold current can be associated with a rating for a maximum continuous electric power of the first DC-to-DC converter 506. The controller 504 can be further configured to cause, in response to the second DC-to-DC converter 508 having been caused to respond to the first subsequent decrease in electric power being conveyed through the second node 512: (1) an output electric power of the first DC-to-DC converter 506 to remain constant and (2) an output electric power of the second DC-to-DC converter 508 to decrease.

Additionally, for example, the controller 504 can be further configured to measure a current through the second DC-to-DC converter 508. The controller 504 can be further configured to cause, in response to a measure of the current through the second DC-to-DC converter 508 being less than or equal to the first threshold current, a change in electric power being conveyed through the first DC-to-DC converter 506 to cause the first DC-to-DC converter 506 to respond to a second subsequent decrease in electric power being conveyed through the second node 512 (e.g., portion IV). For example, the first threshold current can be associated with a rating for a maximum continuous electric power of the second DC-to-DC converter 508.

Additionally, for example, the controller 504 can be further configured to cause, in response to the first DC-to-DC converter 506 having been caused to respond to the second subsequent decrease in electric power being conveyed through the second node 512: (1) the output electric power of the second DC-to-DC converter 508 to remain constant and (2) the output electric power of the first DC-to-DC converter 506 to decrease.

Additionally, for example, the controller 504 can be further configured to cause, in response to the measure of the current through the first DC-to-DC converter 506 being less than or equal to a second threshold current, another change in electric power being conveyed through the second DC-to-DC converter 508 to cause the second DC-to-DC converter 508 to respond to a third subsequent decrease in electric power being conveyed through the second node 512 (e.g., portion V). The second threshold current can be less than the first threshold current. For example, the second threshold current can be associated with effectively no electric power being conveyed through the first DC-to-DC converter 506.

Additionally, for example, the controller 504 can be further configured to cause, in response to the second DC-to-DC converter 508 having been caused to respond to the third subsequent decrease in electric power being conveyed through the second node 512: (1) the output electric power of the first DC-to-DC converter 506 to remain constant and (2) the output electric power of the second DC-to-DC converter 508 to decrease. For example, the output electric power of the second DC-to-DC converter 508 can decrease until the output electric power of the second DC-to-DC converter 508 is equal to effectively no electric power being conveyed through the second DC-to-DC converter 508 (e.g., portion VI).

Additionally, for example, the DC-to-DC converters 502 can further include a third DC-to-DC converter 518. The third DC-to-DC converter 518 can be connected between the first node 510 and the second node 512. The controller 504 can be further configured to measure a current through the second DC-to-DC converter 508.

Figure 10:
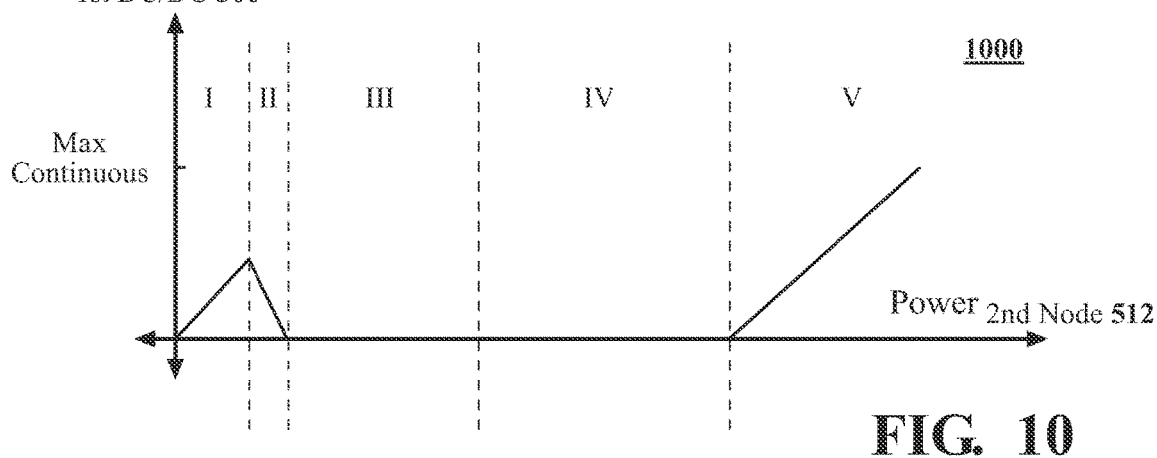
FIG. 10 is a graph of a third example of the amount of electric power that is being conveyed through the first DC-to-DC converter versus the amount of electric power that is being conveyed through the second node.

FIG. 10 is a graph 1000 of a third example of the amount of electric power that is being conveyed through the first DC-to-DC converter 506 versus the amount of electric power that is being conveyed through the second node 512. The graph 1000 can include a portion I, a portion II, a portion III, a portion IV, and a portion V.

Figure 11:
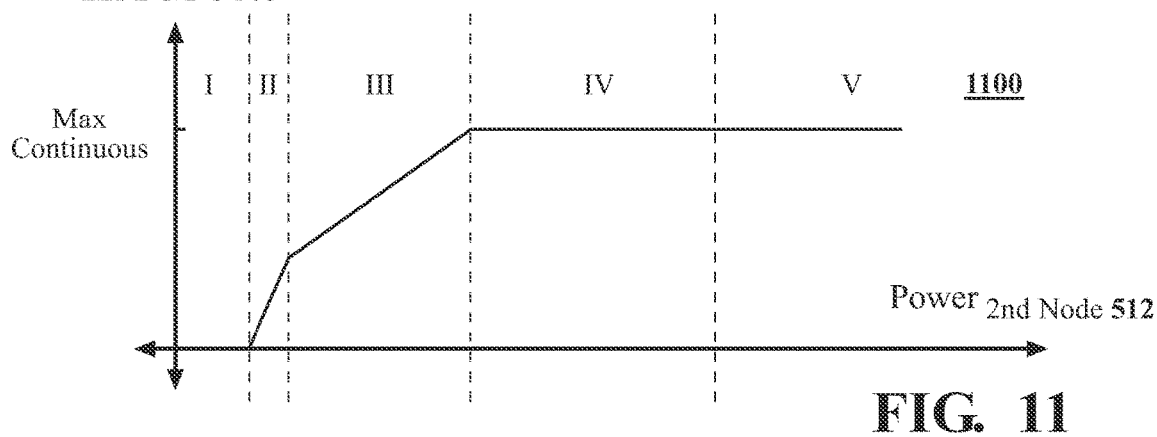
FIG. 11 is a graph of a third example of the amount of electric power that is being conveyed through the second DC-to-DC converter versus the amount of electric power that is being conveyed through the second node.

FIG. 11 is a graph 1100 of a third example of the amount of electric power that is being conveyed through the second DC-to-DC converter 508 versus the amount of electric power that is being conveyed through the second node 512. The graph 1100 can include a portion I, a portion II, a portion III, a portion IV, and a portion V.

Figure 12:
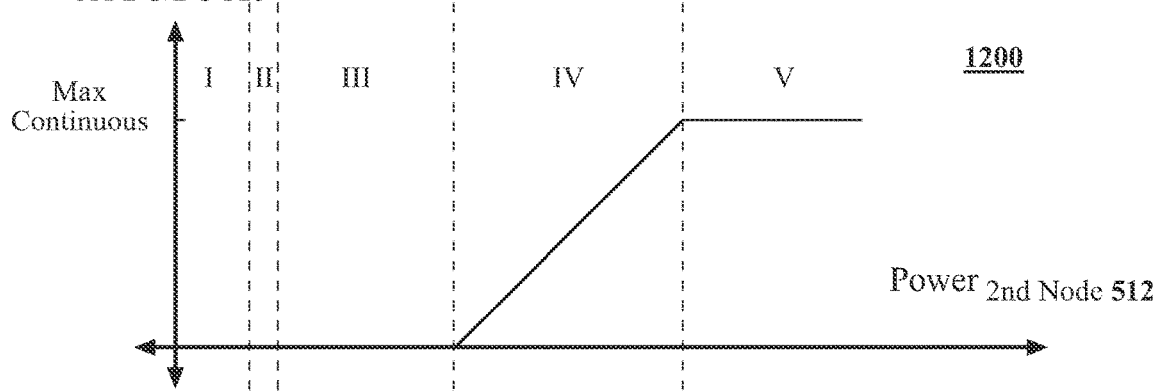
FIG. 12 is a graph of a first example of an amount of electric power that is being conveyed through the third DC-to-DC converter versus the amount of electric power that is being conveyed through the second node.

FIG. 12 is a graph 1200 of a first example of an amount of electric power that is being conveyed through the third DC-to-DC converter 518 versus the amount of electric power that is being conveyed through the second node 512. The graph 1200 can include a portion I, a portion II, a portion III, a portion IV, and a portion V.

With reference to FIGS. 5 and 10-12, for example, an initial change in electric power being conveyed through the second node 512 can be an initial increase in electric power being conveyed through the second node 512 (e.g., portion I). As described above, because a response time of the first DC-to-DC converter 506 to a change in electric power being conveyed through the second node 512 can be faster than a response time of the second DC-to-DC converter 508 to the change in electric power being conveyed through the second node 512, the controller 504 can be further configured to cause the first DC-to-DC converter 506 to respond to the initial increase in electric power being conveyed through the second node 512.

Additionally, for example, the first subsequent change in electric power being conveyed through the second node 512 can be a first subsequent increase in electric power being conveyed through the second node 512 (e.g., portions II and III). For example, the specific relationship with respect to the first threshold current can be being greater than or equal to the first threshold current. As described above, the controller 504 can be configured to measure the current through the first DC-to-DC converter 506. The controller 504 can be configured to cause, in response to a measure of the current through the first DC-to-DC converter 506 being greater than or equal to the first threshold current, a change in electric power being conveyed through the second DC-to-DC converter 508 to cause the second DC-to-DC converter 508 to respond to the first subsequent increase in electric power being conveyed through the second node 512. The controller 504 can be further configured to cause, in response to the second DC-to-DC converter 508 having been caused to respond to the first subsequent increase in electric power being conveyed through the second node 512: (1) an output electric power of the first DC-to-DC converter 506 to remain constant, decrease, or both, (2) an output electric power of the second DC-to-DC converter 508 to increase, and (3) an output electric power of the third DC-to-DC converter 518 to remain constant.

Additionally, for example, a second subsequent change in electric power being conveyed through the second node 512 can be a second subsequent increase in electric power being conveyed through the second node 512 (e.g., portion IV). As described above, the controller 504 can be further configured to measure the current through the second DC-to-DC converter 508. The controller 504 can be further configured to cause, in response to a measure of the current through the second DC-to-DC converter 508 being greater than or equal to the second threshold current, a change in electric power being conveyed through the third DC-to-DC converter 518 to cause the third DC-to-DC converter 518 to respond to the second subsequent increase in electric power being conveyed through the second node 512. The second threshold current can be greater than the first threshold current. For example, the second threshold current can be associated with a rating for a maximum continuous electric power of the second DC-to-DC converter 508. The controller 504 can be further configured to cause, in response to the third DC-to-DC converter 518 having been caused to respond to the second subsequent increase in electric power being conveyed through the second node 512: (1) an output electric power of the first DC-to-DC converter 506 to remain constant, (2) an output electric power of the second DC-to-DC converter 508 to remain constant, and (3) an output electric power of the third DC-to-DC converter 518 to increase.

Additionally, for example, the controller 504 can be further configured to measure a current through the third DC-to-DC converter 518. The controller 504 can be further configured to cause, in response to a measure of the current through the third DC-to-DC converter 518 being greater than or equal to the second threshold current, a change in electric power being conveyed through the first DC-to-DC converter 506 to cause the first DC-to-DC converter 506 to respond to a third subsequent increase in electric power being conveyed through the second node 512 (e.g., portion V). For example, the second threshold current can be associated with a rating for a maximum continuous electric power of the third DC-to-DC converter 518.

Figure 13:
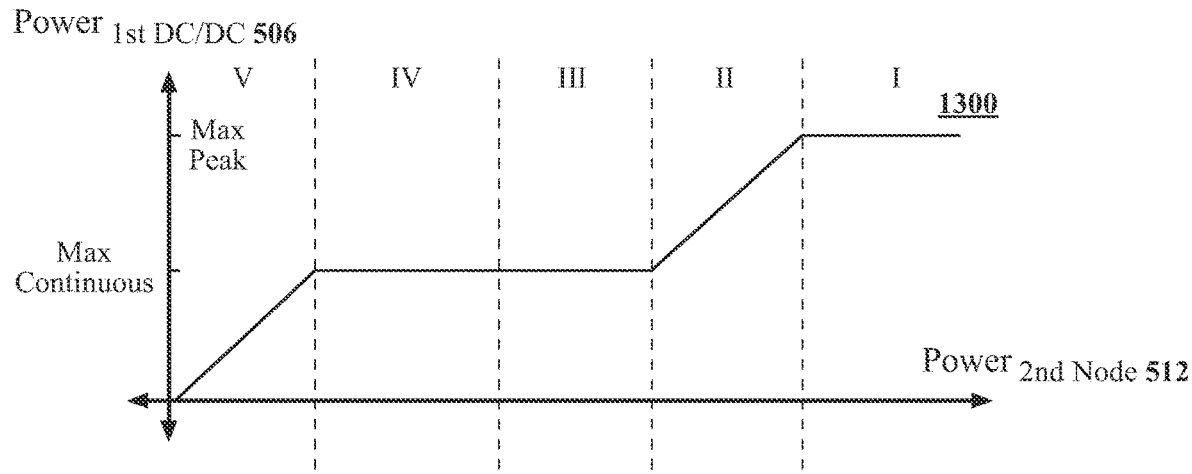
FIG. 13 is a graph of a fourth example of the amount of electric power that is being conveyed through the first DC-to-DC converter versus the amount of electric power that is being conveyed through the second node.

FIG. 13 is a graph 1300 of a fourth example of the amount of electric power that is being conveyed through the first DC-to-DC converter 506 versus the amount of electric power that is being conveyed through the second node 512. The graph 1300 can include a portion I, a portion II, a portion III, a portion IV, and a portion V.

Figure 14:
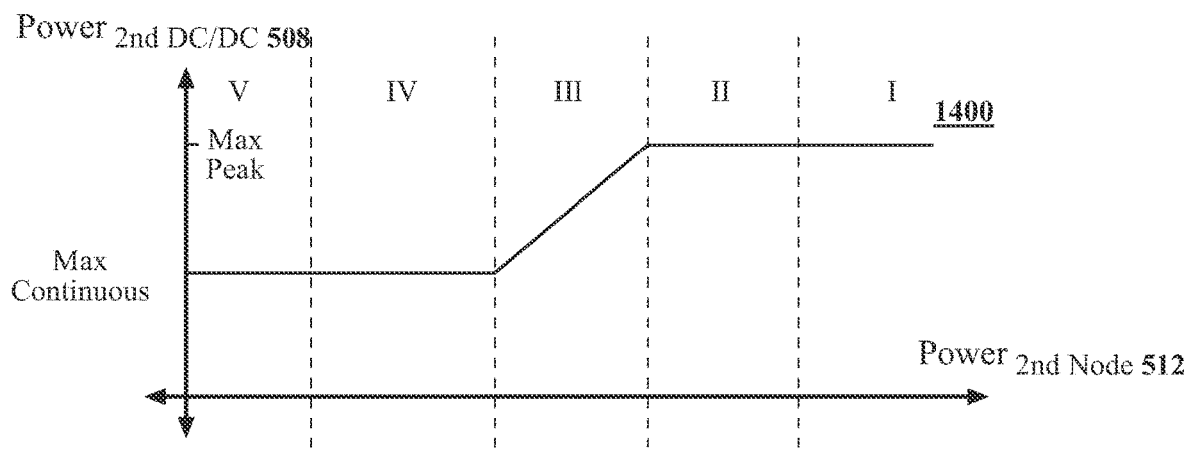
FIG. 14 is a graph of a fourth example of the amount of electric power that is being conveyed through the second DC-to-DC converter versus the amount of electric power that is being conveyed through the second node.

FIG. 14 is a graph 1400 of a fourth example of the amount of electric power that is being conveyed through the second DC-to-DC converter 508 versus the amount of electric power that is being conveyed through the second node 512. The graph 1400 can include a portion I, a portion II, a portion III, a portion IV, and a portion V.

Figure 15:
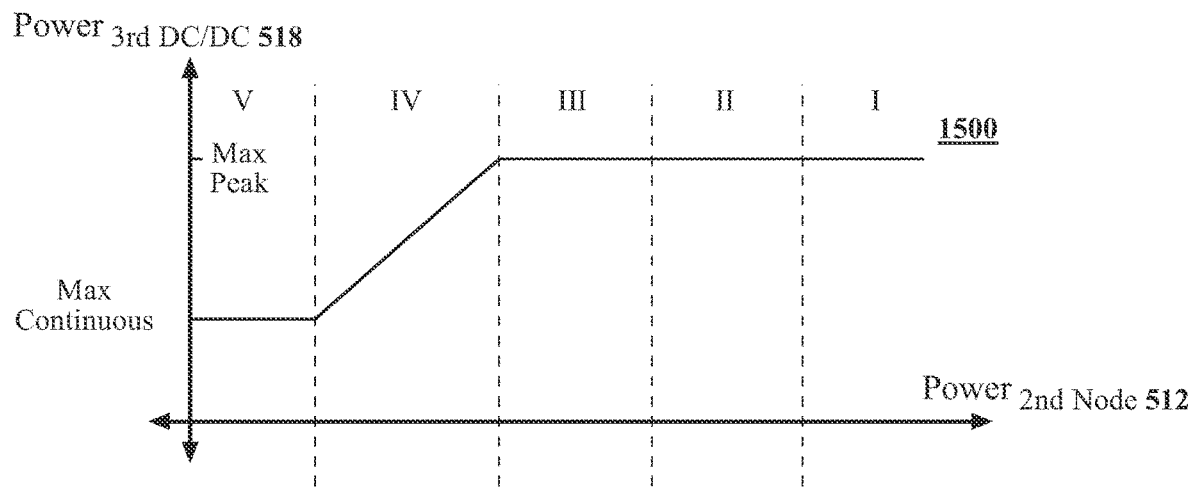
FIG. 15 is a graph of a second example of the amount of electric power that is being conveyed through the third DC-to-DC converter versus the amount of electric power that is being conveyed through the second node.

FIG. 15 is a graph 1500 of a second example of the amount of electric power that is being conveyed through the third DC-to-DC converter 518 versus the amount of electric power that is being conveyed through the second node 512. The graph 1500 can include a portion I, a portion II, a portion III, a portion IV, and a portion V.

With reference to FIGS. 5 and 13-15, for example, an initial electric power being conveyed through the second node 512 can be associated with a sum of a rating for a maximum peak electric power of the first DC-to-DC converter 506 added to a rating for a maximum peak electric power of the second DC-to-DC converter 508 added to a rating for a maximum peak electric power of the third DC-to-DC converter 518 (e.g., portion I). For example, an initial change in electric power being conveyed through the second node 512 can be an initial decrease in electric power being conveyed through the second node 512 (e.g., portion II). As described above, the controller 504 can be further configured to cause the first DC-to-DC converter 506 to respond to the initial decrease in electric power being conveyed through the second node 512.

Additionally, for example, the first subsequent change in electric power being conveyed through the second node 512 can be a first subsequent decrease in electric power being conveyed through the second node 512 (e.g., portion III). For example, the specific relationship with respect to the first threshold current can be being less than or equal to the first threshold current. As described above, the controller 504 can be configured to measure the current through the first DC-to-DC converter 506. The controller 504 can be configured to cause, in response to a measure of the current through the first DC-to-DC converter 506 being greater than or equal to the first threshold current, a change in electric power being conveyed through the second DC-to-DC converter 508 to cause the second DC-to-DC converter 508 to respond to the first subsequent decrease in electric power being conveyed through the second node 512. For example, the first threshold current can be associated with a rating for a maximum continuous electric power of the first DC-to-DC converter 506. The controller 504 can be further configured to cause, in response to the second DC-to-DC converter 508 having been caused to respond to the first subsequent decrease in electric power being conveyed through the second node 512: (1) an output electric power of the first DC-to-DC converter 506 to remain constant, (2) an output electric power of the second DC-to-DC converter 508 to decrease, and (3) an output electric power of the third DC-to-DC converter 518 to remain constant.

Additionally, for example, a second subsequent change in electric power being conveyed through the second node 512 can be a second subsequent decrease in electric power being conveyed through the second node 512 (e.g., portion IV). As described above, the controller 504 can be configured to measure the current through the second DC-to-DC converter 508. The controller 504 can be configured to cause, in response to a measure of the current through the second DC-to-DC converter 508 being less than or equal to the second threshold current, a change in electric power being conveyed through the third DC-to-DC converter 518 to cause the third DC-to-DC converter 518 to respond to the second subsequent decrease in electric power being conveyed through the second node 512. For example, the first threshold current can be associated with a rating for a maximum continuous electric power of the second DC-to-DC converter 508. The controller 504 can be further configured to cause, in response to the third DC-to-DC converter 518 having been caused to respond to the second subsequent decrease in electric power being conveyed through the second node 512: (1) an output electric power of the first DC-to-DC converter 506 to remain constant, (2) an output electric power of the second DC-to-DC converter 508 to remain constant, and (3) an output electric power of the third DC-to-DC converter 518 to decrease.

Additionally, for example, the controller 504 can be further configured to measure a current through the third DC-to-DC converter 518. The controller 504 can be further configured to cause, in response to a measure of the current through the third DC-to-DC converter 518 being less than or equal to the second threshold current, a change in electric power being conveyed through the first DC-to-DC converter 506 to cause the first DC-to-DC converter 506 to respond to a third subsequent increase in electric power being conveyed through the second node 512 (e.g., portion V). For example, the first threshold current can be associated with a rating for a maximum continuous electric power of the third DC-to-DC converter 518.

Figure 16:
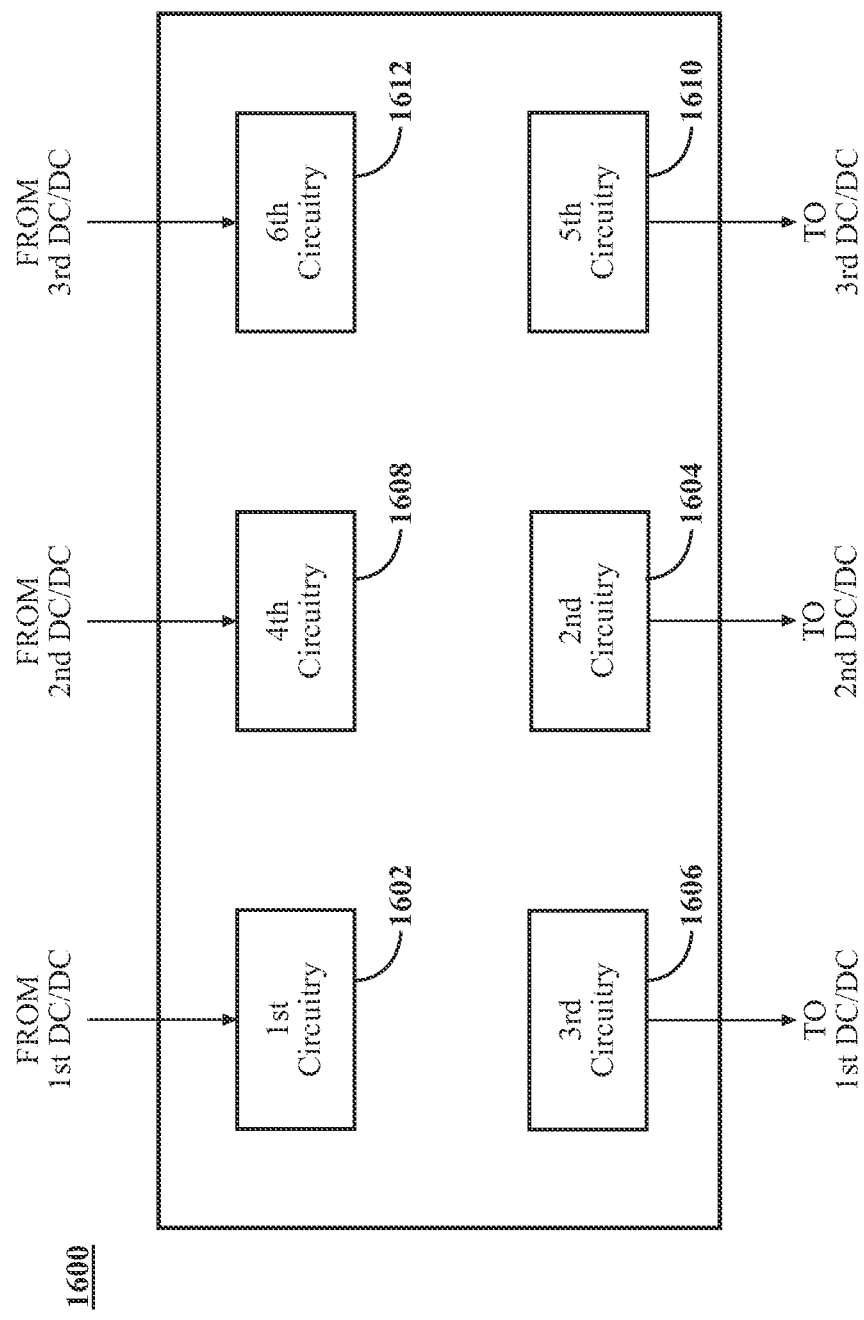
FIG. 16 is a diagram that illustrates an example of a controller for controlling DC-to-DC converters connected in parallel, according to the disclosed technologies.

FIG. 16 is a diagram that illustrates an example of a controller 1600 for controlling DC-to-DC converters connected in parallel, according to the disclosed technologies. The controller 1600 can include, for example, first circuitry 1602 and second circuitry 1604. The first circuitry 1602 can be configured to measure a current through a first DC-to-DC converter. The first DC-to-DC converter can be connected between a first node and a second node. The first DC-to-DC converter can be configured to maintain a first voltage level at the second node. The second circuitry 1604 can be configured to cause, in response to a measures of the current through the first DC-to-DC converter being in a specific relationship with respect to a first threshold current, a change in electric power being conveyed through a second DC-to-DC converter to cause the second DC-to-DC converter to respond to a first subsequent change in electric power being conveyed through the second node. The second DC-to-DC converter can be connected between the first node and the second node.

Additionally, for example, the controller 1600 can further include third circuitry 1606. The third circuitry 1606 can be configured to control an output voltage of the first DC-to-DC converter to maintain the first voltage level at the second node. The second circuitry 1604 can be further configured to control an output current of the second DC-to-DC converter in response to the measure of the current through the first DC-to-DC converter.

For example, the first subsequent change in electric power being conveyed through the second node can be a first subsequent increase in electric power being conveyed through the second node. For example, the specific relationship with respect to the first threshold current can be being greater than or equal to the first threshold current. For example, the controller 1600 can further include the third circuitry 1606. The third circuitry 1606 can be configured to cause, in response to the second DC-to-DC converter having been caused to respond to the first subsequent increase in electric power being conveyed through the second node, an output electric power of the first DC-to-DC converter to remain constant, decrease, or both. The second circuitry 1604 can be further configured to cause, in response to the second DC-to-DC converter having been caused to respond to the first subsequent increase in electric power being conveyed through the second node, an output electric power of the second DC-to-DC converter to increase.

Additionally, for example, the controller 1600 can further include fourth circuitry 1608. The fourth circuitry 1608 can be configured to measure a current through the second DC-to-DC converter. The third circuitry 1606 can be further configured to cause, in response to a measure of the current through the second DC-to-DC converter being greater than or equal to a second threshold current, a change in electric power being conveyed through the first DC-to-DC converter to cause the first DC-to-DC converter to respond to a second subsequent increase in electric power being conveyed through the second node. The second threshold current can be greater than the first threshold current.

Additionally, for example, the second circuitry 1604 can be further configured to cause, in response to the first DC-to-DC converter having been caused to respond to the second subsequent increase in electric power being conveyed through the second node, the output electric power of the second DC-to-DC converter to remain constant. The third circuitry 1606 can be further configured to cause, in response to the first DC-to-DC converter having been caused to respond to the second subsequent increase in electric power being conveyed through the second node, the output electric power of the first DC-to-DC converter to increase.

Additionally, for example, the second circuitry 1604 can be further configured to cause, in response to the measure of the current through the first DC-to-DC converter being greater than or equal to the second threshold current, another change in electric power being conveyed through the second DC-to-DC converter to cause the second DC-to-DC converter to respond to a third subsequent increase in electric power being conveyed through the second node.

Additionally, for example, the third circuitry 1606 can be further configured to cause, in response to the second DC-to-DC converter having been caused to respond to the third subsequent increase in electric power being conveyed through the second node, the output electric power of the first DC-to-DC converter to remain constant. The second circuitry 1604 can be further configured to cause, in response to the second DC-to-DC converter having been caused to respond to the third subsequent increase in electric power being conveyed through the second node, the output electric power of the second DC-to-DC converter to increase.

Additionally, for example, the third circuitry 1606 can be further configured to cause, in response to the measure of the current through the second DC-to-DC converter being greater than or equal to a third threshold current, another change in electric power being conveyed through the first DC-to-DC converter to cause the first DC-to-DC converter to respond to a fourth subsequent increase in electric power being conveyed through the second node. The third threshold current can be greater than the second threshold current.

Additionally, for example, the second circuitry 1604 can be further configured to cause, in response to the first DC-to-DC converter having been caused to respond to the fourth subsequent increase in electric power being conveyed through the second node, the output electric power of the second DC-to-DC converter to remain constant. The third circuitry 1606 can be further configured to cause, in response to the first DC-to-DC converter having been caused to respond to the fourth subsequent increase in electric power being conveyed through the second node, the output electric power of the first DC-to-DC converter to increase.

For example, the first subsequent change in electric power being conveyed through the second node can be a first subsequent decrease in electric power being conveyed through the second node. For example, the specific relationship with respect to the first threshold current can be being less than or equal to the first threshold current. For example, the controller 1600 can further include the third circuitry 1606. The third circuitry 1606 can be configured to cause, in response to the second DC-to-DC converter having been caused to respond to the first subsequent decrease in electric power being conveyed through the second node, an output electric power of the first DC-to-DC converter to remain constant. The second circuitry 1604 can be further configured to cause, in response to the second DC-to-DC converter having been caused to respond to the first subsequent decrease in electric power being conveyed through the second node, an output electric power of the second DC-to-DC converter to decrease.

Additionally, for example, the controller 1600 can further include the fourth circuitry 1608. The fourth circuitry 1608 can be configured to measure a current through the second DC-to-DC converter. The third circuitry 1606 can be further configured to cause, in response to a measure of the current through the second DC-to-DC converter being less than or equal to a second threshold current, a change in electric power being conveyed through the first DC-to-DC converter to cause the first DC-to-DC converter to respond to a second subsequent decrease in electric power being conveyed through the second node.

Additionally, for example, the second circuitry 1604 can be further configured to cause, in response to the first DC-to-DC converter having been caused to respond to the second subsequent decrease in electric power being conveyed through the second node, the output electric power of the second DC-to-DC converter to remain constant. The third circuitry 1606 can be further configured to cause, in response to the first DC-to-DC converter having been caused to respond to the second subsequent decrease in electric power being conveyed through the second node, the output electric power of the first DC-to-DC converter to decrease.

Additionally, for example, the second circuitry 1604 can be further configured to cause, in response to the measure of the current through the first DC-to-DC converter being less than or equal to the second threshold current, another change in electric power being conveyed through the second DC-to-DC converter to cause the second DC-to-DC converter to respond to a third subsequent decrease in electric power being conveyed through the second node. The second threshold current can be less than the first threshold current.

Additionally, for example, the third circuitry 1606 can be further configured to cause, in response to the second DC-to-DC converter having been caused to respond to the third subsequent decrease in electric power being conveyed through the second node, the electric output power of the first DC-to-DC converter to remain constant. The second circuitry 1604 can be further configured to cause, in response to the second DC-to-DC converter having been caused to respond to the third subsequent decrease in electric power being conveyed through the second node, the electric output power of the second DC-to-DC converter to decrease.

For example, the first subsequent change in electric power being conveyed through the second node can be a first subsequent increase in electric power being conveyed through the second node. For example, the specific relationship with respect to the first threshold current can be being greater than or equal to the first threshold current. The controller 1600 can further include the third circuitry 1606. The third circuitry 1606 can be configured to cause, in response to the second DC-to-DC converter having been caused to respond to the first subsequent increase in electric power being conveyed through the second node, an output electric power of the first DC-to-DC converter to remain constant, decrease, or both. The second circuitry 1604 can be further configured to cause, in response to the second DC-to-DC converter having been caused to respond to the first subsequent increase in electric power being conveyed through the second node, an output electric power of the second DC-to-DC converter to increase. The controller 1600 can further include fifth circuitry 1610. The fifth circuitry 1610 can be configured to cause, in response to the second DC-to-DC converter having been caused to respond to the first subsequent increase in electric power being conveyed through the second node, an output electric power of a third DC-to-DC converter to remain constant. The third DC-to-DC converter can be connected between the first node and the second node.

Additionally, for example, a second subsequent change in electric power being conveyed through the second node can be a second subsequent increase in electric power being conveyed through the second node. A second threshold current can be greater than the first threshold current. The controller 1600 can further include the fourth circuitry 1608.

The fourth circuitry 1608 can be configured to measure a current through the second DC-to-DC converter. The fifth circuitry 1610 can be further configured to cause, in response to a measure of the current through the second DC-to-DC converter being greater than or equal to the second threshold current, a change in electric power being conveyed through the third DC-to-DC converter to cause the third DC-to-DC converter to respond to the second subsequent change in electric power being conveyed through the second node. The third circuitry 1608 can be further configured to cause, in response to the third DC-to-DC converter having been caused to respond to the second subsequent increase in electric power being conveyed through the second node, the output electric power of the first DC-to-DC converter to remain constant. The second circuitry 1604 can be further configured to cause, in response to the third DC-to-DC converter having been caused to respond to the second subsequent increase in electric power being conveyed through the second node, the output electric power of the second DC-to-DC converter to remain constant. The fifth circuitry 1608 can be further configured to cause, in response to the third DC-to-DC converter having been caused to respond to the second subsequent increase in electric power being conveyed through the second node, the output electric power of the third DC-to-DC converter to increase.

Additionally, for example, the controller 1600 can further include sixth circuitry 1612. The sixth circuitry 1612 can be configured to measure a current through the third DC-to-DC converter. The third circuitry 1606 can be further configured to cause, in response to a measure of the current through the third DC-to-DC converter being greater than or equal to the second threshold current, a change in electric power being conveyed through the first DC-to-DC converter to cause the first DC-to-DC converter to respond to a third subsequent increase in electric power being conveyed through the second node.

For example, the first subsequent change in electric power being conveyed through the second node can be a first subsequent decrease in electric power being conveyed through the second node. For example, the specific relationship with respect to the first threshold current can be being less than or equal to the first threshold current. The controller 1600 can further include the third circuitry 1606. The third circuitry 1606 can be configured to cause, in response to the second DC-to-DC converter having been caused to respond to the first subsequent decrease in electric power being conveyed through the second node, an output electric power of the first DC-to-DC converter to remain constant. The second circuitry 1604 can be further configured to cause, in response to the second DC-to-DC converter having been caused to respond to the first subsequent decrease in electric power being conveyed through the second node, an output electric power of the second DC-to-DC converter to decrease. The controller 1600 can further include the fifth circuitry 1610. The fifth circuitry 1610 can be configured to cause, in response to the second DC-to-DC converter having been caused to respond to the first subsequent decrease in electric power being conveyed through the second node, an output electric power of a third DC-to-DC converter to remain constant. The third DC-to-DC converter can be connected between the first node and the second node.

Additionally, for example, a second subsequent change in electric power being conveyed through the second node can be a second subsequent decrease in electric power being conveyed through the second node. The controller 1600 can further include the fourth circuitry 1608. The fourth circuitry 1608 can be configured to measure a current through the second DC-to-DC converter. The fifth circuitry 1610 can be further configured to cause, in response to a measures of the current through the second DC-to-DC converter being less than or equal to the first threshold current, a change in electric power being conveyed through the third DC-to-DC converter to cause the third DC-to-DC converter to respond to the second subsequent change in electric power being conveyed through the second node. The third circuitry 1606 can be further configured to cause, in response to the third DC-to-DC converter having been caused to respond to the second subsequent decrease in electric power being conveyed through the second node, the output electric power of the first DC-to-DC converter to remain constant. The second circuitry 1604 can be further configured to cause, in response to the third DC-to-DC converter having been caused to respond to the second subsequent decrease in electric power being conveyed through the second node, the output electric power of the second DC-to-DC converter to remain constant. The fifth circuitry 1610 can be further configured to cause, in response to the third DC-to-DC converter having been caused to respond to the second subsequent decrease in electric power being conveyed through the second node, the output electric power of the third DC-to-DC converter to decrease.

Additionally, for example, the controller 1600 can further include the sixth circuitry 1612. The sixth circuitry 1612 can be configured to measure a current through the third DC-to-DC converter. The third circuitry 1606 can be further configured to cause, in response to a measures of the current through the third DC-to-DC converter being less than or equal to the first threshold current, a change in electric power being conveyed through the first DC-to-DC converter to cause the first DC-to-DC converter to respond to a third subsequent decrease in electric power being conveyed through the second node.

Figure 17:
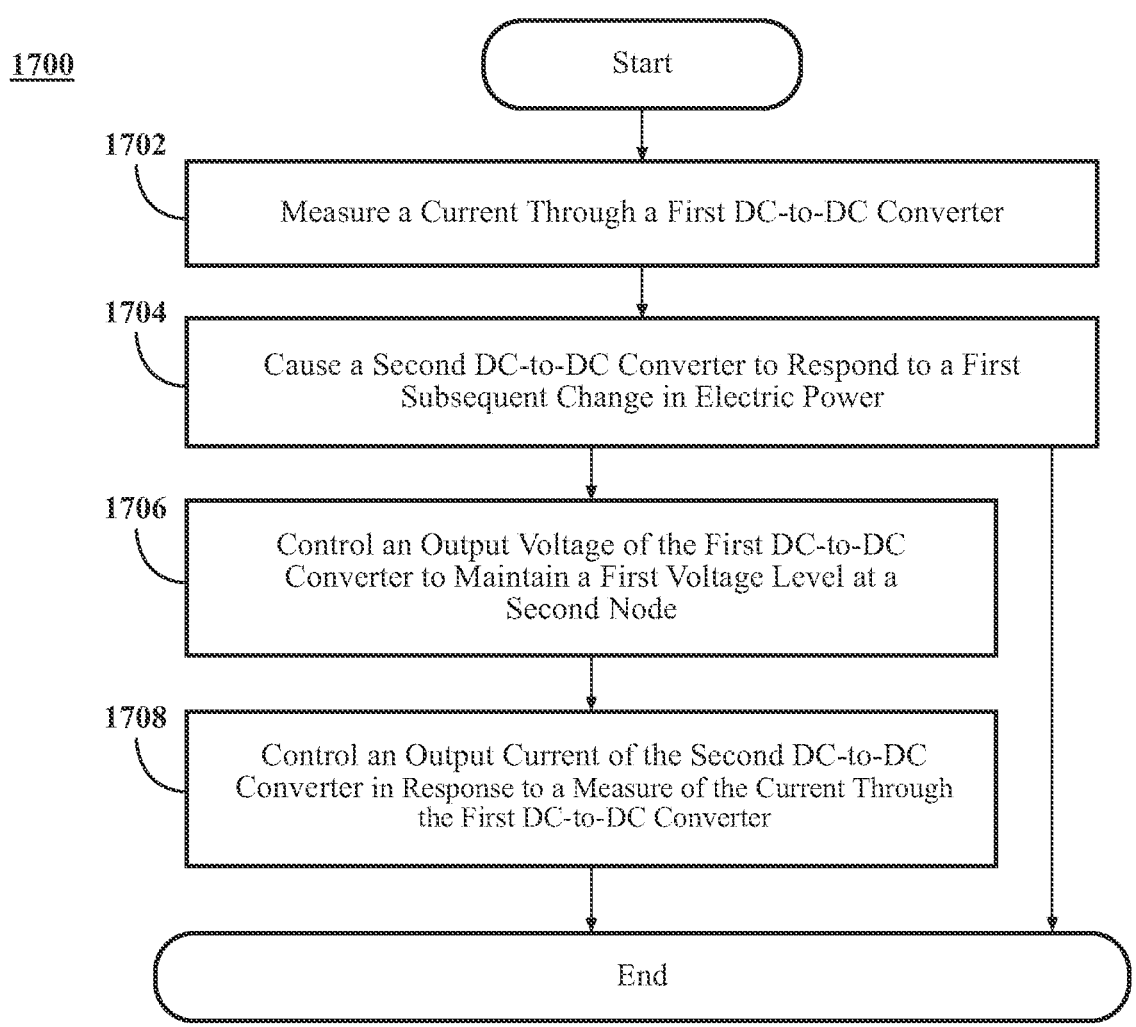
FIG. 17 is a flow diagram that illustrates a first example of a method that is associated with controlling DC-to-DC converters connected in parallel, according to the disclosed technologies.

FIG. 17 is a flow diagram that illustrates a first example of a method 1700 that is associated with controlling DC-to-DC converters connected in parallel, according to the disclosed technologies. The method 1700 is described from the perspective of the controller 1600 illustrated in FIG. 16. Although the method 1700 is described in combination with the controller 1600, one of skill in the art understands, in light of the description herein, that the method 1700 is not limited to being implemented by the controller 1600. Rather, the controller 1600 is an example of a system or a device that may be used to implement the method 1700.

In the method 1700, at an operation 1702, the controller 1600 can measure a current through a first DC-to-DC converter. The first DC-to-DC converter can be connected between a first node and a second node. The first DC-to-DC converter configured to maintain a first voltage level at the second node.

At an operation 1704, the controller 1600 can cause, in response to a measure of the current being in a specific relationship with respect to a first threshold current, a change in electric power being conveyed through a second DC-to-DC converter to cause the second DC-to-DC converter to respond to a first subsequent change in electric power being conveyed through the second node. The second DC-to-DC converter can be connected between the first node and the second node.

Additionally, for example, at an operation 1706, the controller 1600 can control an output voltage of the first DC-to-DC converter to maintain the first voltage level at the second node.

For example, an operation 1708, the controller 1600 can control an output current of the second DC-to-DC converter in response to the measure of the current through the first DC-to-DC converter.

Figure 18A:
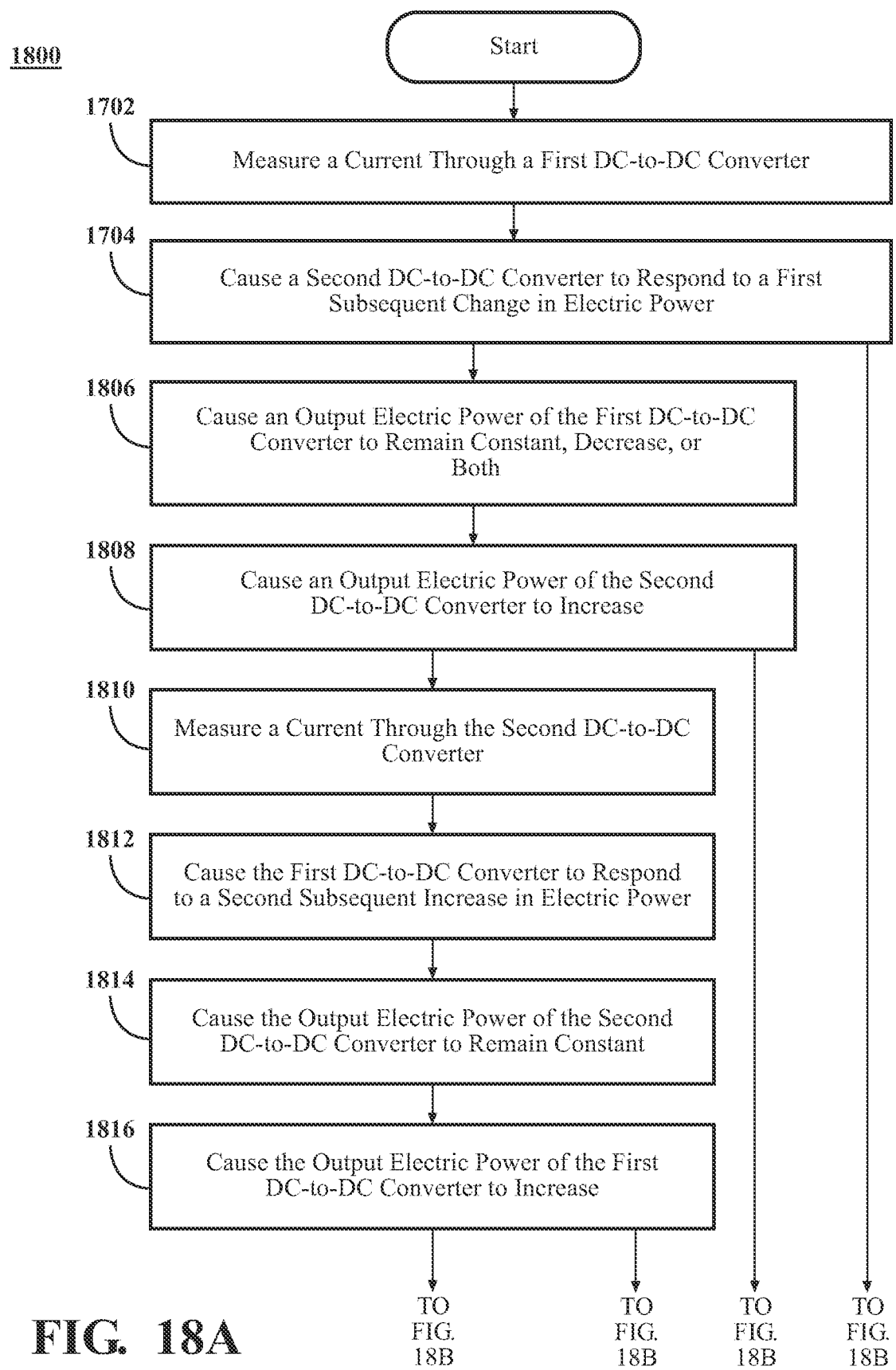
FIGS. 18A and 18B are a flow diagram that illustrates a second example of a method that is associated with controlling DC-to-DC converters connected in parallel, according to the disclosed technologies.
Figure 18B:
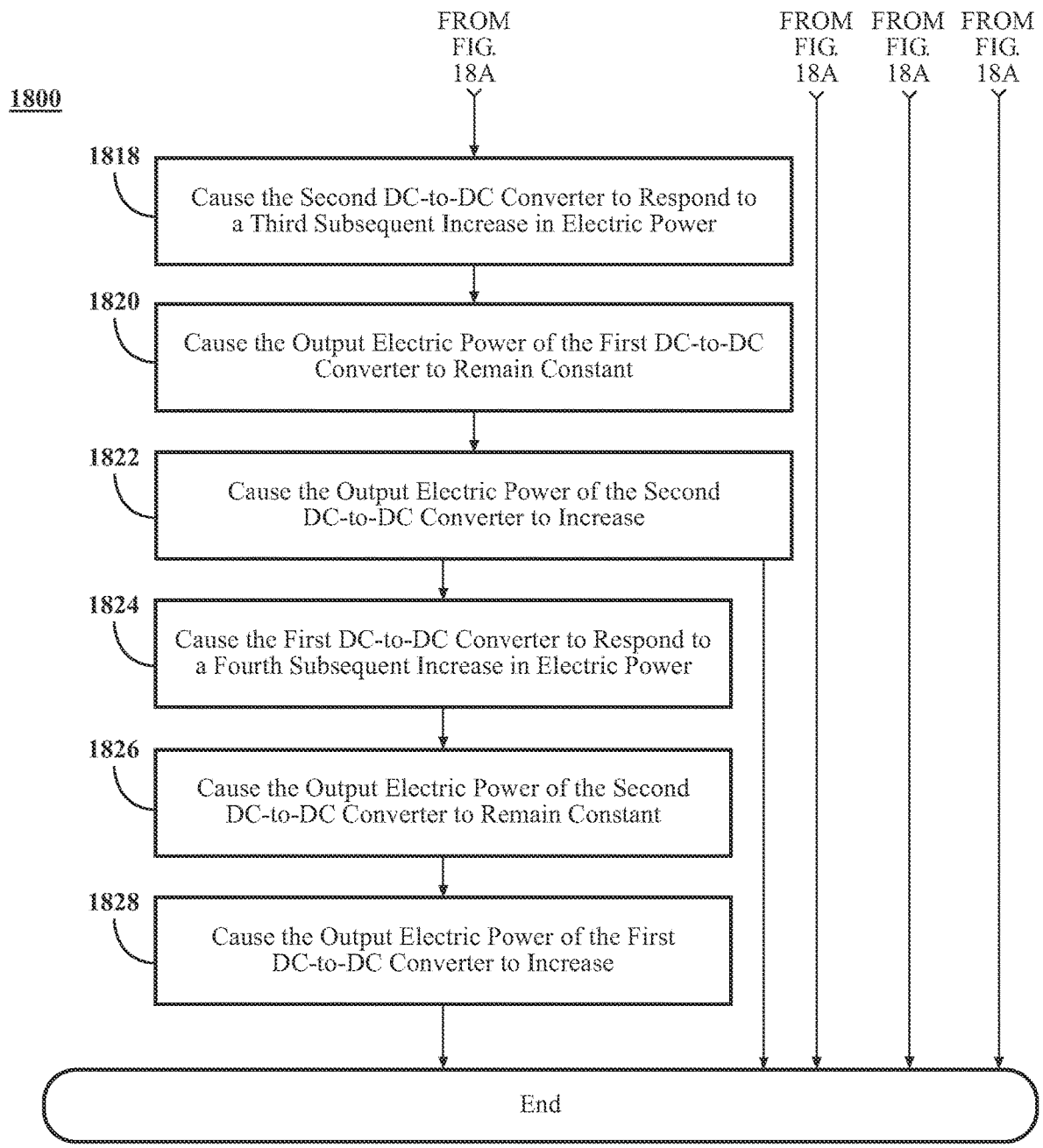

FIGS. 18A and 18B are a flow diagram that illustrates a second example of a method 1800 that is associated with controlling DC-to-DC converters connected in parallel, according to the disclosed technologies. The method 1800 is described from the perspective of the controller 1600 illustrated in FIG. 16. Although the method 1800 is described in combination with the controller 1600, one of skill in the art understands, in light of the description herein, that the method 1800 is not limited to being implemented by the controller 1600. Rather, the controller 1600 is an example of a system or a device that may be used to implement the method 1800.

In FIG. 18A, in the method 1800, at the operation 1702, the controller 1600 can measure the current through the first DC-to-DC converter. The first DC-to-DC converter can be connected between the first node and the second node. The first DC-to-DC converter configured to maintain the first voltage level at the second node.

At the operation 1704, the controller 1600 can cause, in response to the measure of the current through the first DC-to-DC converter being in the specific relationship with respect to the first threshold current, the change in electric power being conveyed through the second DC-to-DC converter to cause the second DC-to-DC converter to respond to the first subsequent change in electric power being conveyed through the second node. The second DC-to-DC converter can be connected between the first node and the second node.

The first subsequent change in electric power being conveyed through the second node can be a first subsequent increase in electric power being conveyed through the second node. The specific relationship with respect to the first threshold current can be being greater than or equal to the first threshold current.

Additionally, for example, at an operation 1806, the controller 1600 can cause, in response to the second DC-to-DC converter having been caused to respond to the first subsequent increase in electric power being conveyed through the second node, an output electric power of the first DC-to-DC converter to remain constant, decrease, or both.

For example, at an operation 1808, the controller 1600 can cause, in response to the second DC-to-DC converter having been caused to respond to the first subsequent increase in electric power being conveyed through the second node, an output electric power of the second DC-to-DC converter to increase.

Additionally, for example, at an operation 1810, the controller 1600 can measure a current through the second DC-to-DC converter.

For example, at an operation 1812, the controller 1600 can cause, in response to a measure of the current through the second DC-to-DC converter being greater than or equal to a second threshold current, a change in electric power being conveyed through the first DC-to-DC converter to cause the first DC-to-DC converter to respond to a second subsequent increase in electric power being conveyed through the second node. The second threshold current can be greater than the first threshold current.

For example, at an operation 1814, the controller 1600 can cause, in response to the first DC-to-DC converter having been caused to respond to the second subsequent increase in electric power being conveyed through the second node, the output electric power of the second DC-to-DC converter to remain constant.

For example, at an operation 1816, the controller 1600 can cause, in response to the first DC-to-DC converter having been caused to respond to the second subsequent increase in electric power being conveyed through the second node, the output electric power of the first DC-to-DC converter to increase.

In FIG. 18B, in the method 1800, additionally, for example, at an operation 1818, the controller 1600 can cause, in response to the measure of the current through the first DC-to-DC converter being greater than or equal to the second threshold current, another change in electric power being conveyed through the second DC-to-DC converter to cause the second DC-to-DC converter to respond to a third subsequent increase in electric power being conveyed through the second node.

For example, at an operation 1820, the controller 1600 can cause, in response to the second DC-to-DC converter having been caused to respond to the third subsequent increase in electric power being conveyed through the second node, the output electric power of the first DC-to-DC converter to remain constant.

For example, at an operation 1822, the controller 1600 can cause, in response to the second DC-to-DC converter having been caused to respond to the third subsequent increase in electric power being conveyed through the second node, the output electric power of the second DC-to-DC converter to increase.

Additionally, for example, at an operation 1824, the controller 1600 can cause, in response to the measure of the current through the second DC-to-DC converter being greater than or equal to a third threshold current, another change in electric power being conveyed through the first DC-to-DC converter to cause the first DC-to-DC converter to respond to a fourth subsequent increase in electric power being conveyed through the second node. The third threshold current can be greater than the second threshold current.

For example, at an operation 1826, the controller 1600 can cause, in response to the first DC-to-DC converter having been caused to respond to the fourth subsequent increase in electric power being conveyed through the second node, the output electric power of the second DC-to-DC converter to remain constant.

For example, at an operation 1828, the controller 1600 can cause, in response to the first DC-to-DC converter having been caused to respond to the fourth subsequent increase in electric power being conveyed through the second node, the output electric power of the first DC-to-DC converter to increase.

Figure 19A:
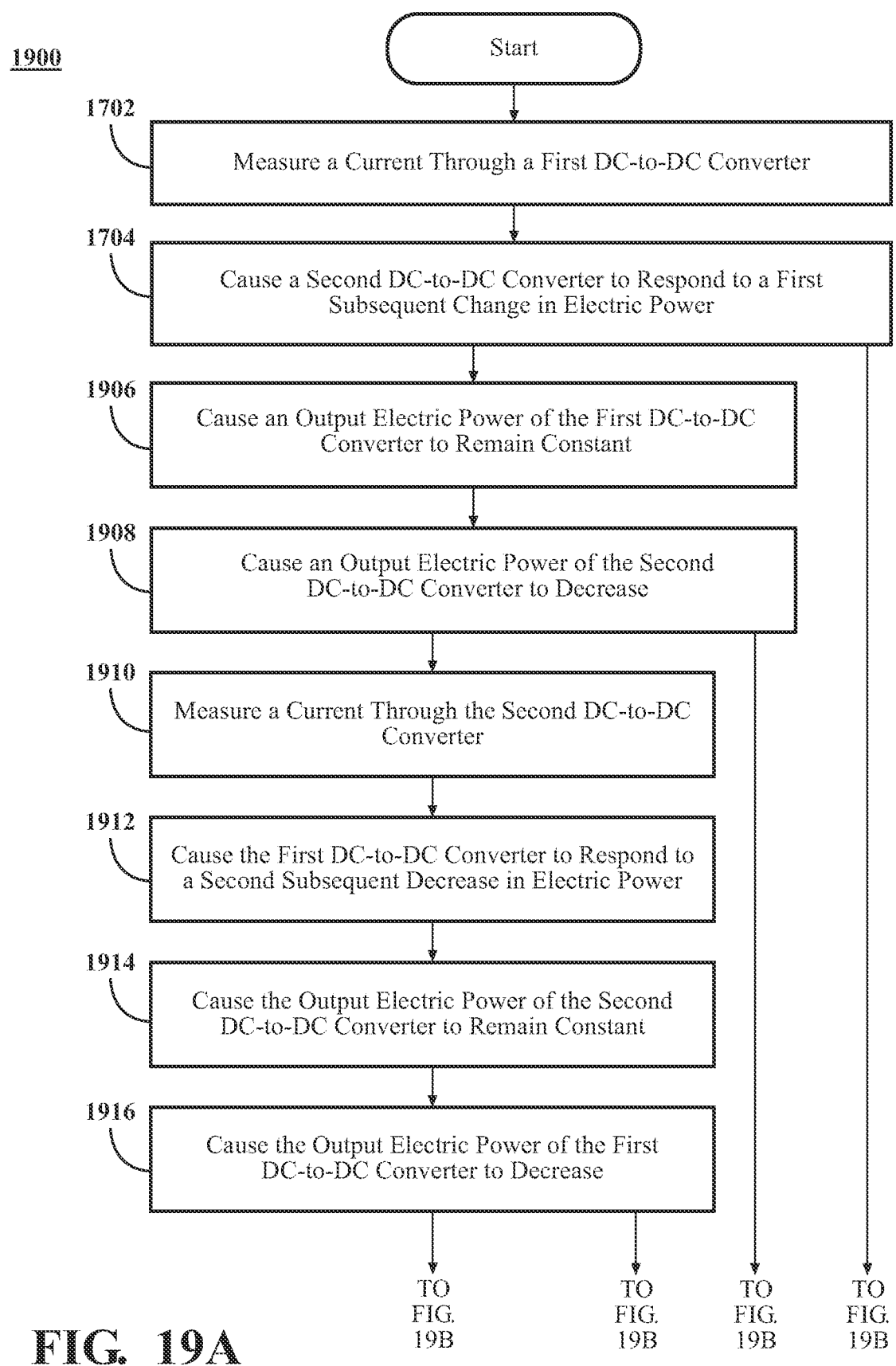
FIGS. 19A and 19B are a flow diagram that illustrates a third example of a method that is associated with controlling DC-to-DC converters connected in parallel, according to the disclosed technologies.
Figure 19B:
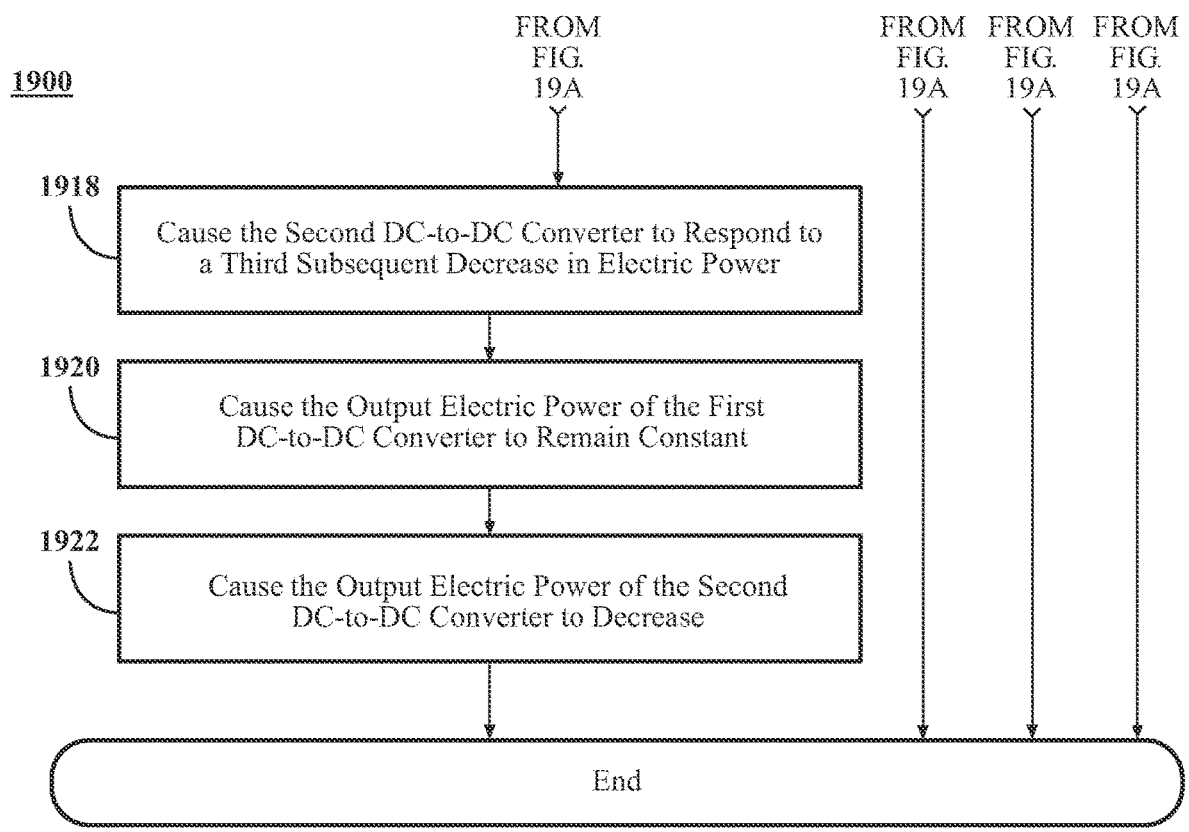

FIGS. 19A and 19B are a flow diagram that illustrates a third example of a method 1900 that is associated with controlling DC-to-DC converters connected in parallel, according to the disclosed technologies. The method 1900 is described from the perspective of the controller 1600 illustrated in FIG. 16. Although the method 1900 is described in combination with the controller 1600, one of skill in the art understands, in light of the description herein, that the method 1900 is not limited to being implemented by the controller 1600. Rather, the controller 1600 is an example of a system or a device that may be used to implement the method 1900.

In FIG. 19A, in the method 1900, at the operation 1702, the controller 1600 can measure the current through the first DC-to-DC converter. The first DC-to-DC converter can be connected between the first node and the second node. The first DC-to-DC converter configured to maintain the first voltage level at the second node.

At the operation 1704, the controller 1600 can cause, in response to the current being equal to the first threshold current, the second DC-to-DC converter to respond to the measure of the current through the first DC-to-DC converter being in the specific relationship with respect to the first threshold current, the change in electric power being conveyed through the second DC-to-DC converter to cause the second DC-to-DC converter to respond to the first subsequent change in electric power being conveyed through the second node. The second DC-to-DC converter can be connected between the first node and the second node.

The first subsequent change in electric power being conveyed through the second node can be a first subsequent decrease in electric power being conveyed through the second node. The specific relationship with respect to the first threshold current can be being less than or equal to the first threshold current.

Additionally, for example, at an operation 1906, the controller 1600 can cause, in response to the second DC-to-DC converter having been caused to respond to the first subsequent decrease in electric power being conveyed through the second node, an output electric power of the first DC-to-DC converter to remain constant.

For example, at an operation 1908, the controller 1600 can cause, in response to the second DC-to-DC converter having been caused to respond to the first subsequent decrease in electric power being conveyed through the second node, an output electric power of the second DC-to-DC converter to decrease.

Additionally, for example, at an operation 1910, the controller 1600 can measure a current through the second DC-to-DC converter.

For example, at an operation 1912, the controller 1600 can cause, in response to a measure of the current through the second DC-to-DC converter being less than or equal to a second threshold current, a change in electric power being conveyed through the first DC-to-DC converter to cause the first DC-to-DC converter to respond to a second subsequent decrease in electric power being conveyed through the second node.

For example, at an operation 1914, the controller 1600 can cause, in response to the first DC-to-DC converter having been caused to respond to the second subsequent decrease in electric power being conveyed through the second node, the output electric power of the second DC-to-DC converter to remain constant.

For example, at an operation 1916, the controller 1600 can cause, in response to the first DC-to-DC converter having been caused to respond to the second subsequent decrease in electric power being conveyed through the second node, the output electric power of the first DC-to-DC converter to decrease.

In FIG. 19B, in the method 1900, additionally, for example, at an operation 1918, the controller 1600 can cause, in response to the measure of the current through the first DC-to-DC converter being less than or equal to the second threshold current, another change in electric power being conveyed through the second DC-to-DC converter to cause the second DC-to-DC converter to respond to a third subsequent decrease in electric power being conveyed through the second node. The second threshold current can be less than the first threshold current.

For example, at an operation 1920, the controller 1600 can cause, in response to the second DC-to-DC converter having been caused to respond to the third subsequent decrease in electric power being conveyed through the second node, the electric output power of the first DC-to-DC converter to remain constant.

For example, at an operation 1922, the controller 1600 can cause, in response to the second DC-to-DC converter having been caused to respond to the third subsequent decrease in electric power being conveyed through the second node, the electric output power of the second DC-to-DC converter to decrease.

Figure 20A:
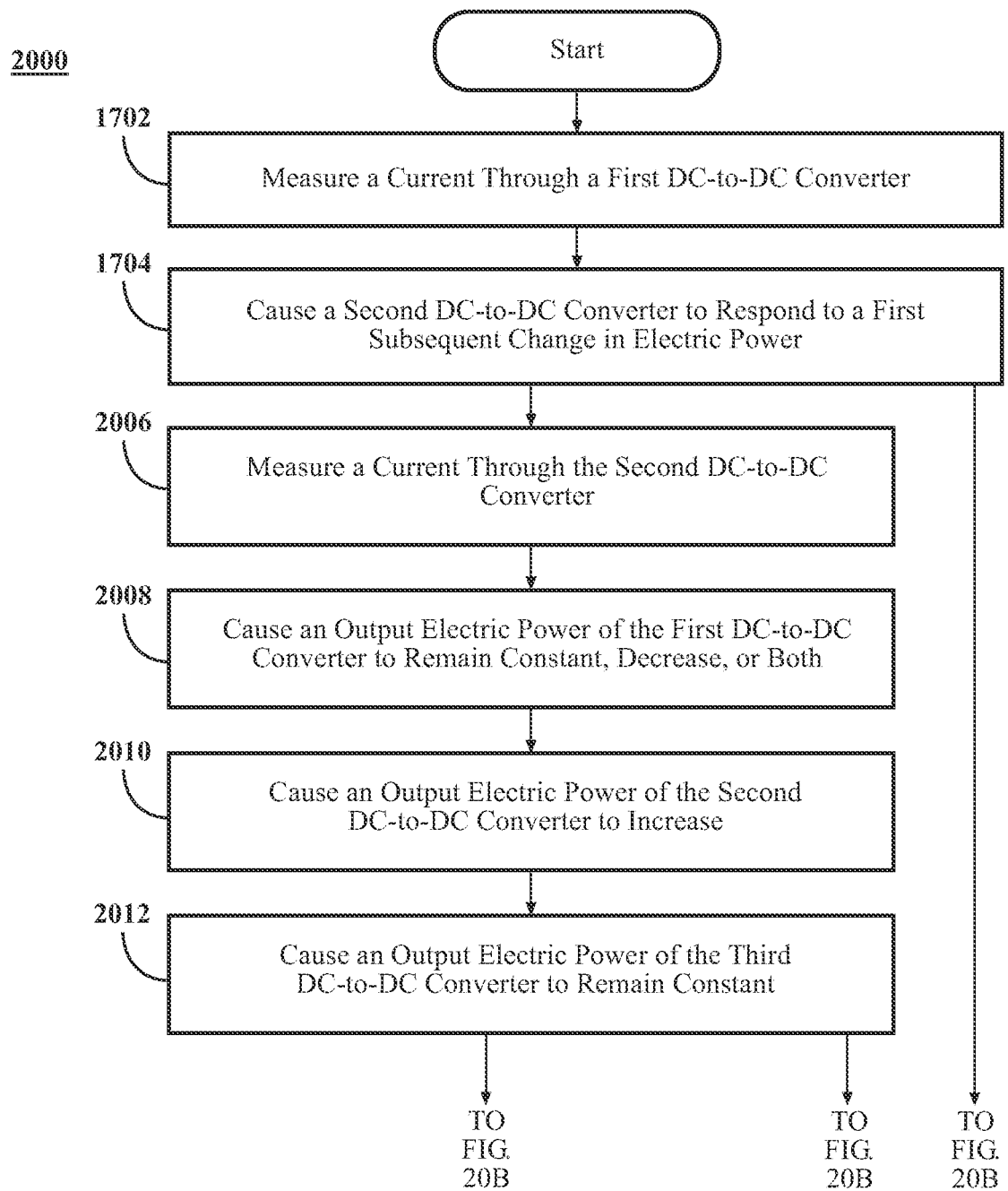
FIGS. 20A and 20B are a flow diagram that illustrates a fourth example of a method that is associated with controlling DC-to-DC converters connected in parallel, according to the disclosed technologies.
Figure 20B:
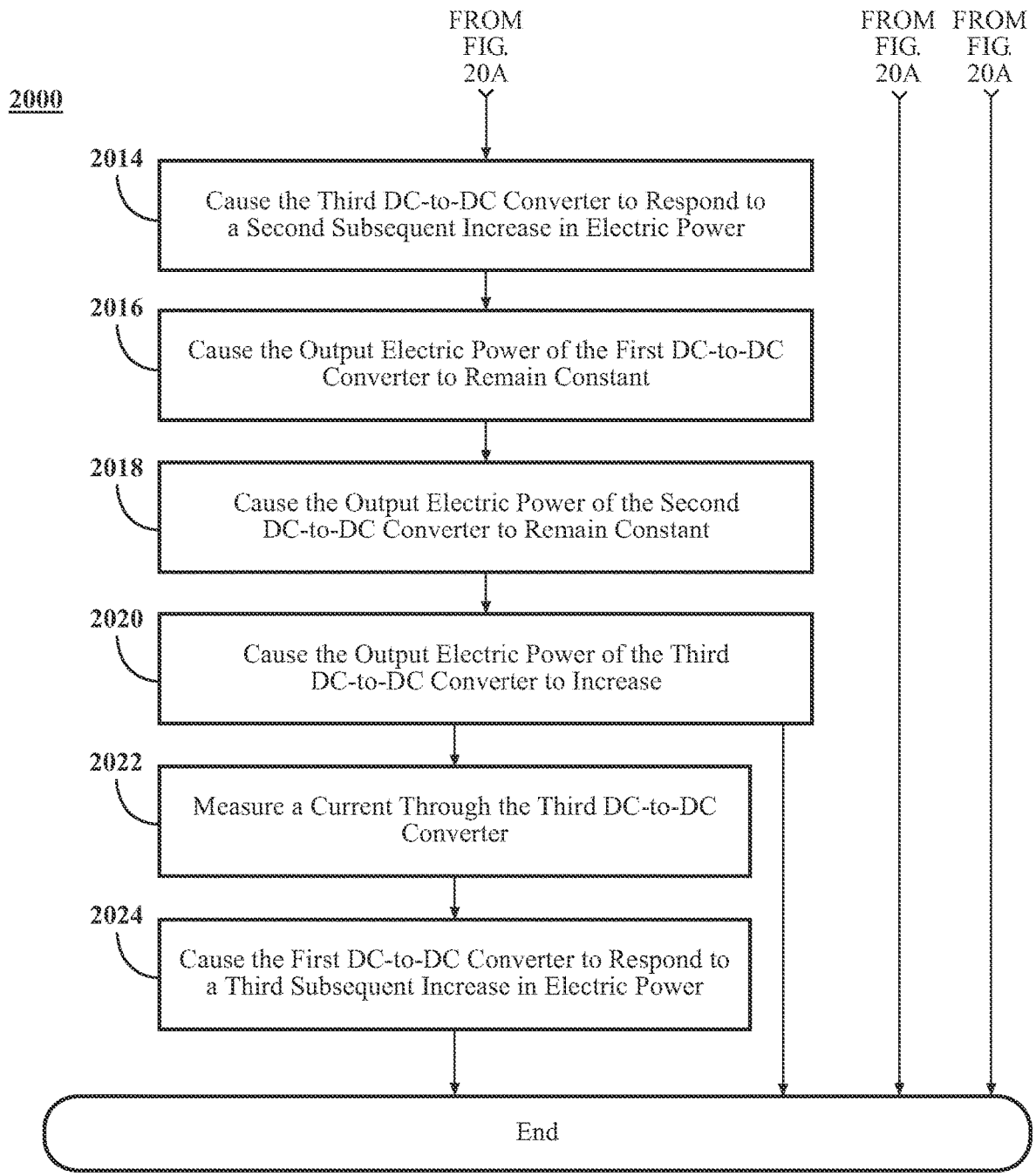

FIGS. 20A and 20B are a flow diagram that illustrates a fourth example of a method 2000 that is associated with controlling DC-to-DC converters connected in parallel, according to the disclosed technologies. The method 2000 is described from the perspective of the controller 1600 illustrated in FIG. 16. Although the method 2000 is described in combination with the controller 1600, one of skill in the art understands, in light of the description herein, that the method 2000 is not limited to being implemented by the controller 1600. Rather, the controller 1600 is an example of a system or a device that may be used to implement the method 2000.

In FIG. 20A, in the method 2000, at the operation 1702, the controller 1600 can measure the current through the first DC-to-DC converter. The first DC-to-DC converter can be connected between the first node and the second node. The first DC-to-DC converter configured to maintain the first voltage level at the second node.

At the operation 1704, the controller 1600 can cause, in response to the measure of the current through the first DC-to-DC converter being in the specific relationship with respect to the first threshold current, the change in electric power being conveyed through the second DC-to-DC converter to cause the second DC-to-DC converter to respond to the first subsequent change in electric power being conveyed through the second node. The second DC-to-DC converter can be connected between the first node and the second node.

The first subsequent change in electric power being conveyed through the second node can be a first subsequent increase in electric power being conveyed through the second node. The specific relationship with respect to the first threshold current can be being greater than or equal to the first threshold current.

Additionally, for example, at an operation 2006, the controller 1600 can measure a current through the second DC-to-DC converter.

For example, at an operation 2008, the controller 1600 can cause, in response to the second DC-to-DC converter having been caused to respond to the first subsequent increase in electric power being conveyed through the second node, an output electric power of the first DC-to-DC converter to remain constant, decrease, or both.

For example, at an operation 2010, the controller 1600 can cause, in response to the second DC-to-DC converter having been caused to respond to the first subsequent increase in electric power being conveyed through the second node, an output electric power of the second DC-to-DC converter to increase.

For example, at an operation 2012, the controller 1600 can cause, in response to the second DC-to-DC converter having been caused to respond to the first subsequent increase in electric power being conveyed through the second node, an output electric power of a third DC-to-DC converter to remain constant. The third DC-to-DC converter can be connected between the first node and the second node.

A second subsequent change in electric power being conveyed through the second node can be a second subsequent increase in electric power being conveyed through the second node. A second threshold current can be greater than the first threshold current.

In FIG. 20B, in the method 2000, additionally, for example, at an operation 2014, the controller 1600 can cause, in response to a measure of the current through the second DC-to-DC converter being greater than or equal to the second threshold current, a change in electric power being conveyed through the third DC-to-DC converter to cause the third DC-to-DC converter to respond to the second subsequent change in electric power being conveyed through the second node.

For example, at an operation 2016, the controller 1600 can cause, in response to the third DC-to-DC converter having been caused to respond to the second subsequent increase in electric power being conveyed through the second node, the output electric power of the first DC-to-DC converter to remain constant.

For example, at an operation 2018, the controller 1600 can cause, in response to the third DC-to-DC converter having been caused to respond to the second subsequent increase in electric power being conveyed through the second node, the output electric power of the second DC-to-DC converter to remain constant.

For example, at an operation 2020, the controller 1600 can cause, in response to the third DC-to-DC converter having been caused to respond to the second subsequent increase in electric power being conveyed through the second node, the output electric power of the third DC-to-DC converter to increase.

Additionally, for example, at an operation 2022, the controller 1600 can measure a current through the third DC-to-DC converter.

For example, at an operation 2024, the controller 1600 can cause, in response to a measure of the current through the third DC-to-DC converter being greater than or equal to the second threshold current, a change in electric power being conveyed through the first DC-to-DC converter to cause the first DC-to-DC converter to respond to a third subsequent increase in electric power being conveyed through the second node.

Figure 21A:
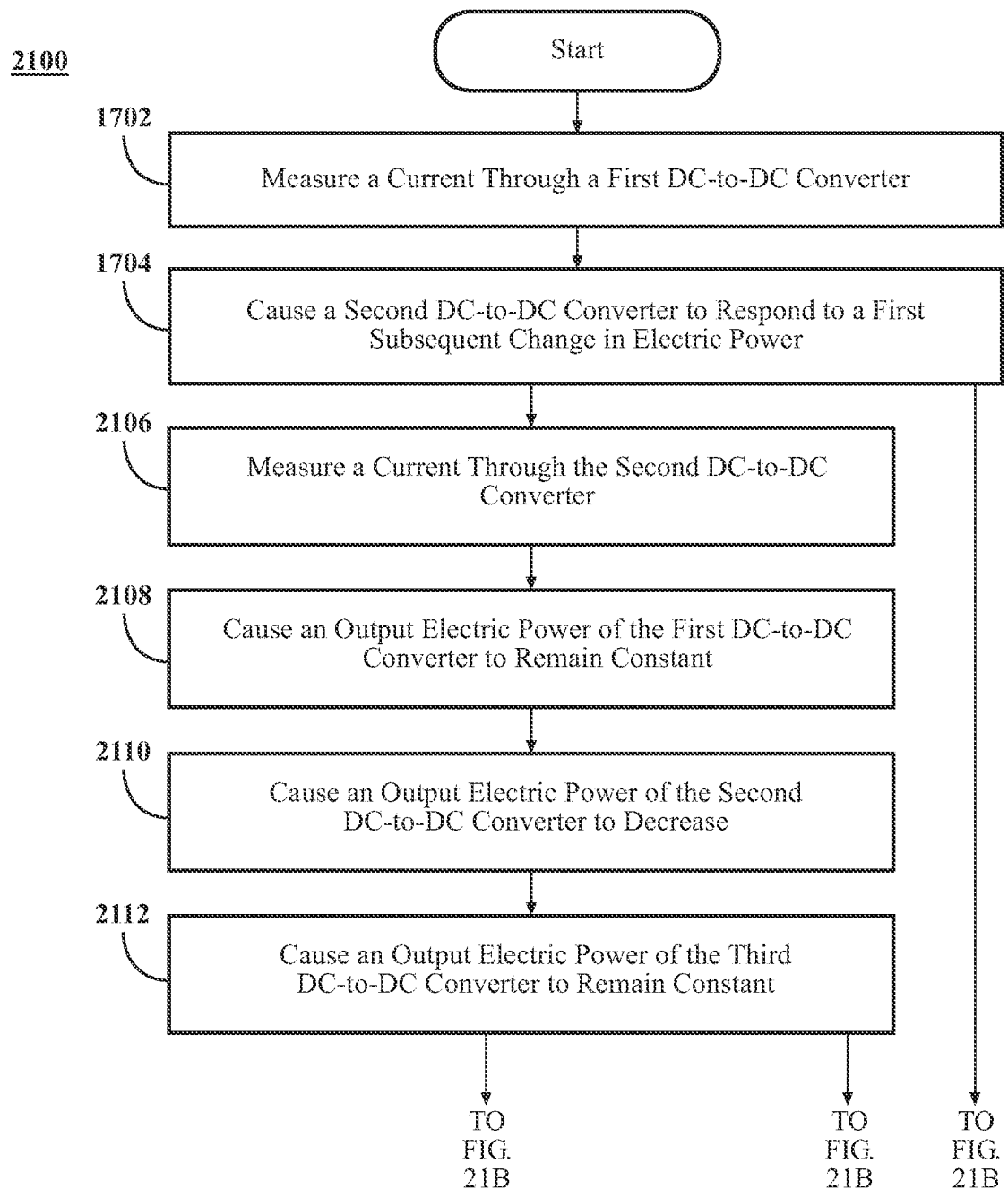
FIGS. 21A and 21B are a flow diagram that illustrates a fifth example of a method that is associated with controlling DC-to-DC converters connected in parallel, according to the disclosed technologies.
Figure 21B:
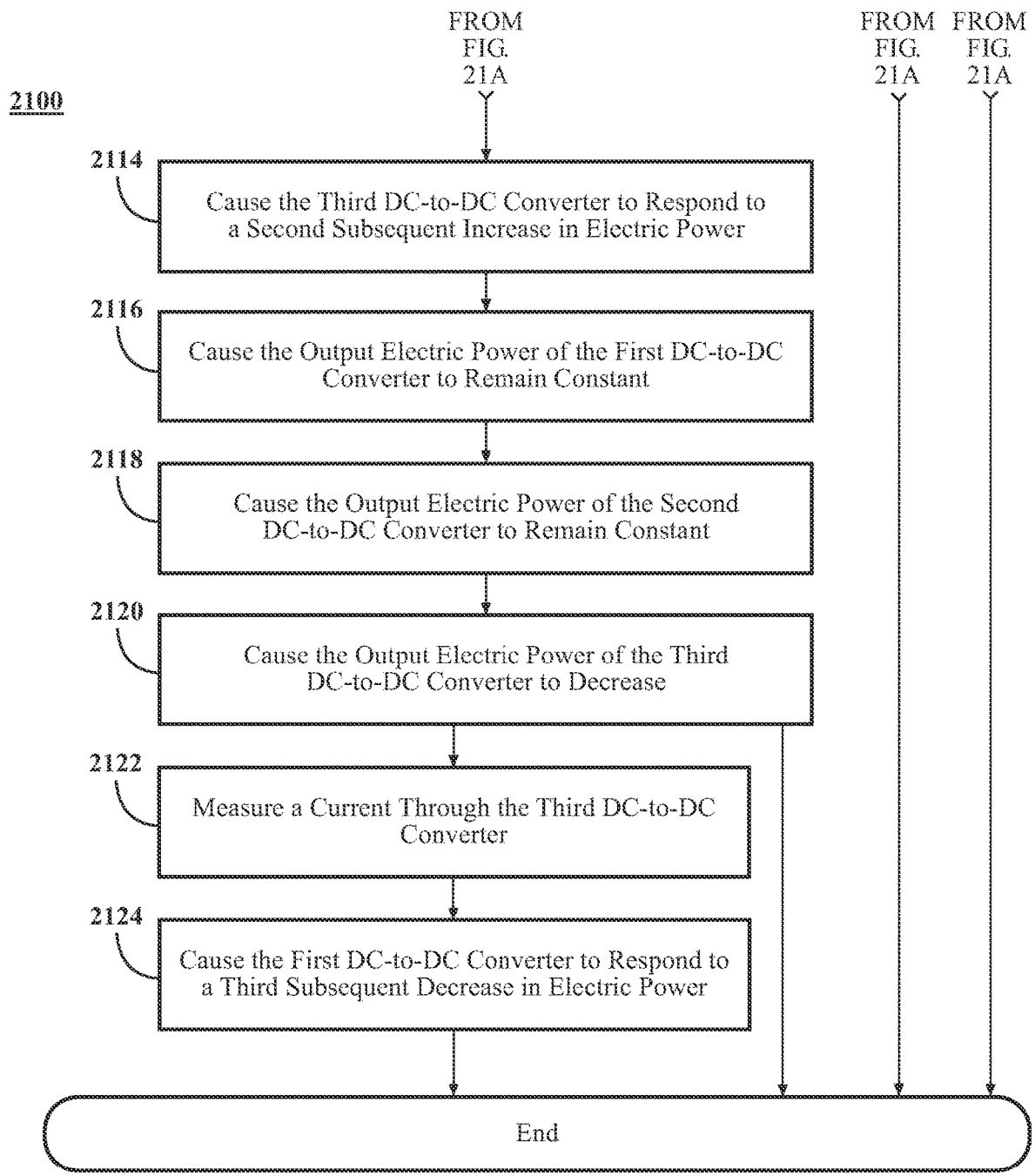

FIGS. 21A and 21B are a flow diagram that illustrates a fifth example of a method 2100 that is associated with controlling DC-to-DC converters connected in parallel, according to the disclosed technologies. The method 2100 is described from the perspective of the controller 1600 illustrated in FIG. 16. Although the method 2100 is described in combination with the controller 1600, one of skill in the art understands, in light of the description herein, that the method 2100 is not limited to being implemented by the controller 1600. Rather, the controller 1600 is an example of a system or a device that may be used to implement the method 2100.

In FIG. 21A, in the method 2100, at the operation 1702, the controller 1600 can measure the current through the first DC-to-DC converter. The first DC-to-DC converter can be connected between the first node and the second node. The first DC-to-DC converter configured to maintain the first voltage level at the second node.

At the operation 1704, the controller 1600 can cause, in response to the measure of the current through the first DC-to-DC converter being in the specific relationship with respect to the first threshold current, the change in electric power being conveyed through the second DC-to-DC converter to cause the second DC-to-DC converter to respond to the first subsequent change in electric power being conveyed through the second node. The second DC-to-DC converter can be connected between the first node and the second node. The second DC-to-DC converter can be configured to maintain the first voltage level at the second node.

The first subsequent change in electric power being conveyed through the second node can be a first subsequent decrease in electric power being conveyed through the second node. The specific relationship with respect to the first threshold current can be being less than or equal to the first threshold current.

Additionally, for example, at an operation 2106, the controller 1600 can measure a current through the second DC-to-DC converter.

For example, at an operation 2108, the controller 1600 can cause, in response to the second DC-to-DC converter having been caused to respond to the first subsequent decrease in electric power being conveyed through the second node, an output electric power of the first DC-to-DC converter to remain constant.

For example, at an operation 2110, the controller 1600 can cause, in response to the second DC-to-DC converter having been caused to respond to the first subsequent decrease in electric power being conveyed through the second node, an output electric power of the second DC-to-DC converter to decrease.

For example, at an operation 2112, the controller 1600 can cause, in response to the second DC-to-DC converter having been caused to respond to the first subsequent decrease in electric power being conveyed through the second node, an output electric power of the third DC-to-DC converter to remain constant.

A second subsequent change in electric power being conveyed through the second node can be a second subsequent decrease in electric power being conveyed through the second node.

In FIG. 21B, in the method 2100, additionally, for example, at an operation 2114, the controller 1600 can cause, in response to a measure of the current through the second DC-to-DC converter being less than or equal to the first threshold current, a change in electric power being conveyed through the third DC-to-DC converter to cause the third DC-to-DC converter to respond to the second subsequent change in electric power being conveyed through the second node.

For example, at an operation 2116, the controller 1600 can cause, in response to the third DC-to-DC converter having been caused to respond to the second subsequent decrease in electric power being conveyed through the second node, the output electric power of the first DC-to-DC converter to remain constant.

For example, at an operation 2118, the controller 1600 can cause, in response to the third DC-to-DC converter having been caused to respond to the second subsequent decrease in electric power being conveyed through the second node, the output electric power of the second DC-to-DC converter to remain constant.

For example, at an operation 2120, the controller 1600 can cause, in response to the third DC-to-DC converter having been caused to respond to the second subsequent decrease in electric power being conveyed through the second node, the output electric power of the third DC-to-DC converter to decrease.

Additionally, for example, at an operation 2122, the controller 1600 can measure a current through the third DC-to-DC converter.

For example, at an operation 2124, the controller 1600 can cause, in response a measure of to the current through the third DC-to-DC converter being less than or equal to the first threshold current, a change in electric power being conveyed through the first DC-to-DC converter to cause the first DC-to-DC converter to respond to a third subsequent decrease in electric power being conveyed through the second node.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 5-17, 18A, 18B, 19A, 19B, 20A, 20B, 21A, and 21B, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A system, comprising:
    a first DC-to-DC converter, connected between a first node and a second node, and configured to maintain a first voltage level at the second node;
    a second DC-to-DC converter, connected between the first node and the second node; and
    a controller configured to:
        measure a current through the first DC-to-DC converter;
        cause, in response to a measure of the current being in a specific relationship with respect to a first threshold current, a change in electric power being conveyed through the second DC-to-DC converter to cause the second DC-to-DC converter to respond to a first subsequent change in electric power being conveyed through the second node, the first subsequent change in electric power being one of an increase or a decrease; and
        cause, in response to the second DC-to-DC converter having been caused to respond to the first subsequent change in electric power being conveyed through the second node:
            an output electric power of the first DC-to-DC converter to change in a manner that is different from the first subsequent change in electric power; and
            an output electric power of the second DC-to-DC converter to change according to the first subsequent change in electric power.

2. The system of claim 1, wherein the controller is further configured to control:
    an output voltage of the first DC-to-DC converter to maintain the first voltage level at the second node; and
    an output current of the second DC-to-DC converter in response to the measure of the current through the first DC-to-DC converter,
    wherein a response time of the first DC-to-DC converter to a change in electric power being conveyed through the second node is faster than a response time of the second DC-to-DC converter to the change in electric power being conveyed through the second node.

3. The system of claim 1, wherein at least one of the first DC-to-DC converter or the second DC-to-DC converter comprises at least one of a step-down (buck) converter, a step-up (boost) converter, an inverting (buck-boost) converter, a true buck-boost converter, a single-ended primary-inductor converter (SEPIC), a Ćuk converter, a split-pi (boost-buck) converter, a forward converter, a push-pull (half bridge) converter, a full bridge converter, a flyback converter, an interleaved converter, a switched capacitor converter, or an electromechanical converter.

4. The system of claim 1, wherein:
    the first DC-to-DC converter comprises a first bidirectional converter and is further configured to maintain a second voltage level at the first node; and
    the second DC-to-DC converter comprises a second bidirectional converter.

5. The system of claim 1, wherein:
    the first node is configured to be connected to an energy storage device, the energy storage device being configured to provide electric power at a second voltage level; and
    the second node is configured to be connected to a DC load.

6. The system of claim 5, wherein:
    the energy storage device comprises one of a battery, a capacitor, or a fuel cell system; and
    the DC load comprises at least one of a busbar or an inverter.

7. The system of claim 1, wherein the system is disposed on a vehicle.

8. The system of claim 1, wherein:
    the first subsequent change in electric power being conveyed through the second node is a first subsequent increase in electric power being conveyed through the second node;
    the specific relationship with respect to the first threshold current is being greater than or equal to the first threshold current; and
    the controller is configured to cause, in response to the second DC-to-DC converter having been caused to respond to the first subsequent increase in electric power being conveyed through the second node:
        the output electric power of the first DC-to-DC converter to at least one of remain constant or decrease; and
        the output electric power of the second DC-to-DC converter to increase.

9. The system of claim 8, wherein the controller is further configured to:
    measure a current through the second DC-to-DC converter; and
    cause, in response to a measure of the current through the second DC-to-DC converter being greater than or equal to a second threshold current, a change in electric power being conveyed through the first DC-to-DC converter to cause the first DC-to-DC converter to respond to a second subsequent increase in electric power being conveyed through the second node, the second threshold current being greater than the first threshold current.

10. The system of claim 1, wherein:
    the first subsequent change in electric power being conveyed through the second node is a first subsequent decrease in electric power being conveyed through the second node;
    the specific relationship with respect to the first threshold current is being less than or equal to the first threshold current; and
    the controller is configured to cause, in response to the second DC-to-DC converter having been caused to respond to the first subsequent decrease in electric power being conveyed through the second node:
        the output electric power of the first DC-to-DC converter to remain constant; and
        the output electric power of the second DC-to-DC converter to decrease.

11. The system of claim 10, wherein the controller is further configured to:
    measure a current through the second DC-to-DC converter; and
    cause, in response to a measure of the current through the second DC-to-DC converter being less than or equal to a second threshold current, a change in electric power being conveyed through the first DC-to-DC converter to cause the first DC-to-DC converter to respond to a second subsequent decrease in electric power being conveyed through the second node.

12. The system of claim 1, further comprising a third DC-to-DC converter, connected between the first node and the second node, wherein the controller is further configured to measure a current through the second DC-to-DC converter.

13. The system of claim 12, wherein:
the first subsequent change in electric power being conveyed through the second node is a first subsequent increase in electric power being conveyed through the second node;
the specific relationship with respect to the first threshold current is being greater than or equal to the first threshold current;
a second subsequent change in electric power being conveyed through the second node is a second subsequent increase in electric power being conveyed through the second node;
a second threshold current is greater than the first threshold current; and
the controller is configured to cause:
in response to the second DC-to-DC converter having been caused to respond to the first subsequent increase in electric power being conveyed through the second node:
the output electric power of the first DC-to-DC converter to at least one of remain constant or decrease;
the output electric power of the second DC-to-DC converter to increase; and
an output electric power of the third DC-to-DC converter to remain constant;
in response to a measure of the current through the second DC-to-DC converter being greater than or equal to the second threshold current, a change in electric power being conveyed through the third DC-to-DC converter to cause the third DC-to-DC converter to respond to the second subsequent change in electric power being conveyed through the second node; and
in response to the third DC-to-DC converter having been caused to respond to the second subsequent increase in electric power being conveyed through the second node:
the output electric power of the first DC-to-DC converter to remain constant;
the output electric power of the second DC-to-DC converter to remain constant; and
the output electric power of the third DC-to-DC converter to increase.

14. The system of claim 13, wherein the controller is further configured to:
measure a current through the third DC-to-DC converter; and
cause, in response to a measure of the current through the third DC-to-DC converter being greater than or equal to the second threshold current, a change in electric power being conveyed through the first DC-to-DC converter to cause the first DC-to-DC converter to respond to a third subsequent increase in electric power being conveyed through the second node.

15. The system of claim 12, wherein:
the first subsequent change in electric power being conveyed through the second node is a first subsequent decrease in electric power being conveyed through the second node;
the specific relationship with respect to the first threshold current is being less than or equal to the first threshold current;
a second subsequent change in electric power being conveyed through the second node is a second subsequent decrease in electric power being conveyed through the second node; and
the controller is configured to cause:
in response to the second DC-to-DC converter having been caused to respond to the first subsequent decrease in electric power being conveyed through the second node:
the output electric power of the first DC-to-DC converter to remain constant;
the output electric power of the second DC-to-DC converter to decrease; and
an output electric power of the third DC-to-DC converter to remain constant; and
in response to a measure of the current through the second DC-to-DC converter being less than or equal to the second threshold current, a change in electric power being conveyed through the third DC-to-DC converter to cause the third DC-to-DC converter to respond to the second subsequent change in electric power being conveyed through the second node; and
in response to the third DC-to-DC converter having been caused to respond to the second subsequent decrease in electric power being conveyed through the second node:
the output electric power of the first DC-to-DC converter to remain constant;
the output electric power of the second DC-to-DC converter to remain constant; and
the output electric power of the third DC-to-DC converter to decrease.

16. The system of claim 15, wherein the controller is further configured to:
measure a current through the third DC-to-DC converter; and
cause, in response to a measure of the current through the third DC-to-DC converter being less than or equal to the second threshold current, a change in electric power being conveyed through the first DC-to-DC converter to cause the first DC-to-DC converter to respond to a third subsequent decrease in electric power being conveyed through the second node.

17. A controller, comprising:
first circuitry configured to measure a current through a first DC-to-DC converter, the first DC-to-DC converter connected between a first node and a second node, the first DC-to-DC converter configured to maintain a voltage level at the second node;
second circuitry configured to cause:
in response to a measure of the current through the first DC-to-DC converter being in a specific relationship with respect to a threshold current, a change in electric power being conveyed through a second DC-to-DC converter to cause the second DC-to-DC converter to respond to a subsequent change in electric power being conveyed through the second node, the second DC-to-DC converter connected between the first node and the second node, the subsequent change in electric power being one of an increase or a decrease; and
in response to the second DC-to-DC converter having been caused to respond to the subsequent change in electric power being conveyed through the second node, an output electric power of the second DC-to-DC converter to change according to the subsequent change in electric power; and third circuitry configured to cause, in response to the second DC-to-DC converter having been caused to respond to the subsequent change in electric power being conveyed through the second node, an output electric power of the first DC-to-DC converter to change in a manner that is different from the subsequent change in electric power.

18. The controller of claim 17, wherein:

the third circuitry is further configured to control an output voltage of the first DC-to-DC converter to maintain the first voltage level at the second node; and the second circuitry is further configured to control an output current of the second DC-to-DC converter in response to the measure of the current through the first DC-to-DC converter.

19. A method, comprising:

measuring, by a controller, a current through a first DC-to-DC converter, the first DC-to-DC converter connected between a first node and a second node, the first DC-to-DC converter configured to maintain a voltage level at the second node;

causing, by the controller and in response to the current being equal to a threshold current, a second DC-to-DC converter to respond to a measure of the current through the first DC-to-DC converter being in a specific relationship with respect to a threshold current, a change in electric power being conveyed through a second DC-to-DC converter to cause the second DC-to-DC converter to respond to a subsequent change in electric power being conveyed through the second node, the second DC-to-DC converter connected between the first node and the second node, the subsequent change in electric power being one of an increase or a decrease; and causing, by the controller and in response to the second DC-to-DC converter having been caused to respond to the subsequent change in electric power being conveyed through the second node:

an output electric power of the first DC-to-DC converter to change in a manner that is different from the first subsequent change in electric power; and an output electric power of the second DC-to-DC converter to change according to the first subsequent change in electric power.

20. The method of claim 19, wherein:

the subsequent change in electric power being conveyed through the second node is a subsequent increase in electric power being conveyed through the second node;

the specific relationship with respect to the threshold current is being greater than or equal to the threshold current;

the causing the output electric power of the first DC-to-DC converter to change in the manner that is different from the first subsequent change in electric power comprises causing, by the controller and in response to the second DC-to-DC converter having been caused to respond to the subsequent increase in electric power being conveyed through the second node, the output electric power of the first DC-to-DC converter to at least one of remain constant or decrease; and the causing the output electric power of the second DC-to-DC converter to change according to the first subsequent change in electric power comprises causing, by the controller and in response to the second DC-to-DC converter having been caused to respond to the subsequent increase in electric power being conveyed through the second node, the output electric power of the second DC-to-DC converter to increase.

* * * * *